(12) United States Patent
Cernohous et al.

(10) Patent No.: US 6,630,239 B2
(45) Date of Patent: Oct. 7, 2003

(54) COMPATIBILIZED PRESSURE-SENSITIVE ADHESIVES

(75) Inventors: Jeffrey J. Cernohous, Plymouth, MN (US); Douglas A. Devens, Jr., St. Paul, MN (US); Maria B. Urquiola, Inver Grove Heights, MN (US); Paul Hattam, Baldwin, WI (US); Patrick D. Hyde, Burnsville, MN (US); Richard A. Kollaja, Dusseldorf (DE)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/068,071

(22) Filed: Feb. 5, 2002

(65) Prior Publication Data

US 2002/0132925 A1 Sep. 19, 2002

(Under 37 CFR 1.47)

Related U.S. Application Data

(62) Division of application No. 09/499,831, filed on Feb. 8, 2000, now Pat. No. 6,379,791.

(51) Int. Cl.⁷ .............................. B32B 7/12; B32B 7/10
(52) U.S. Cl. ............ 428/355 R; 428/354; 428/355 RA; 428/355 EN; 428/355 BL
(58) Field of Search .......................... 428/355 R, 354, 428/355 RA, 355 EN, 355 BL

(56) References Cited

U.S. PATENT DOCUMENTS

| | | |
|---|---|---|
| 3,307,963 A | 3/1967 | Webber |
| 3,565,985 A | 2/1971 | Shrenk et al. |
| 4,107,233 A | 8/1978 | Hansen |
| 4,223,067 A | 9/1980 | Levens |
| 4,260,659 A | 4/1981 | Gobran |
| 4,288,358 A | 9/1981 | Trotter et al. |
| 4,410,482 A | 10/1983 | Subramanian |
| 4,415,615 A | 11/1983 | Esmay et al. |
| 4,661,303 A | 4/1987 | Chum et al. |
| 4,693,776 A | 9/1987 | Krampe et al. |
| 4,699,842 A | 10/1987 | Jorgensen et al. |
| 4,894,259 A | 1/1990 | Kuller |
| 4,908,278 A | 3/1990 | Bland et al. |
| 5,024,880 A | 6/1991 | Veasley et al. |
| 5,047,196 A | 9/1991 | Zuckerberg et al. |
| 5,143,972 A | 9/1992 | Groves |
| 5,164,454 A | 11/1992 | Suga et al. |
| 5,281,651 A | 1/1994 | Arjunan et al. |
| 5,296,547 A | 3/1994 | Nestegard et al. |
| 5,412,031 A | 5/1995 | Ma et al. |
| 5,660,922 A | 8/1997 | Herridge et al. |
| 5,753,768 A | 5/1998 | Ellis |
| 5,811,493 A | 9/1998 | Kent |
| 5,852,118 A | 12/1998 | Horrion et al. |
| 6,045,895 A | 4/2000 | Hyde et al. |
| 6,162,859 A | 12/2000 | Lu et al. |
| 6,184,290 B1 | 2/2001 | Ahmed et al. |
| 6,184,291 B1 | 2/2001 | Ahmed et al. |
| 6,221,448 B1 | 4/2001 | Baetzold et al. |

FOREIGN PATENT DOCUMENTS

| | | |
|---|---|---|
| EP | 0 352 901 A1 | 1/1990 |
| EP | 0 312 228 B1 | 9/1992 |
| EP | 0 921 153 A1 | 6/1999 |
| JP | 50 107032 A | 8/1975 |
| JP | 63 304077 A | 6/1987 |
| JP | 3-162475 | 7/1991 |
| JP | 4-18344 | 1/1992 |
| JP | 07 003235 A | 6/1993 |
| WO | WO 93/15141 | 8/1993 |
| WO | WO 94/21727 | 9/1994 |
| WO | WO 96/25469 | 8/1996 |
| WO | Wo 97/23577 | 7/1997 |

OTHER PUBLICATIONS

A. Eisenberg, "Compatibilization of Polymers via Coulombic Interactions", IUPAC Macromolecular Symposium, (1982), 877.
Dr. L. A. Utracki, *Polymer Alloys and Blends: Thermodynamics and Rheology*, (1990), 117–129.
Phillip J. Cole et al., "Polymer–Polymer Adhesion in Melt–Processes Layered Structures", ANTEC '99, 1849–1853.

*Primary Examiner*—Tae H. Yoon
(74) *Attorney, Agent, or Firm*—Dean M. Harts; Douglas B. Little

(57) ABSTRACT

Disclosed is a composite pressure-sensitive adhesive comprising from about 95 to about 5 parts by weight of an acrylic pressure-sensitive adhesive; from about 5 to about 95 parts by weight of an at least partially soluble (in a solvent) polymer, and a compatibilizer present in the composite pressure-sensitive adhesive in an amount greater than 0 to about 10 parts by weight of the composite pressure-sensitive adhesive. The polymer is selected from the group consisting of a butadiene-containing polymer, an isoprene-containing polymer, a saturated olefin-containing polymer, and a styrene-containing polymer. The compatibilizer in the adhesive has a structure selected from the group consisting of (1) an acrylic adhesive-compatible segment and a polymer-compatible segment wherein at least a portion of the compatibilizer is present throughout either the acrylic adhesive, the polymer, or both, and (2) an acrylic adhesive-reactive segment and a polymer-compatible segment wherein at least a portion of the compatibilizer is present throughout the polymer.

20 Claims, 5 Drawing Sheets

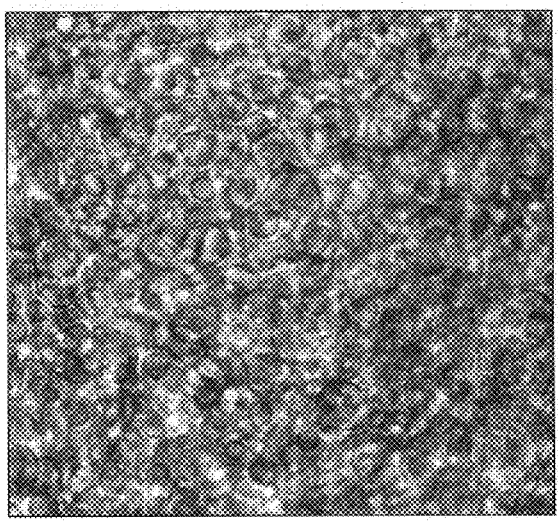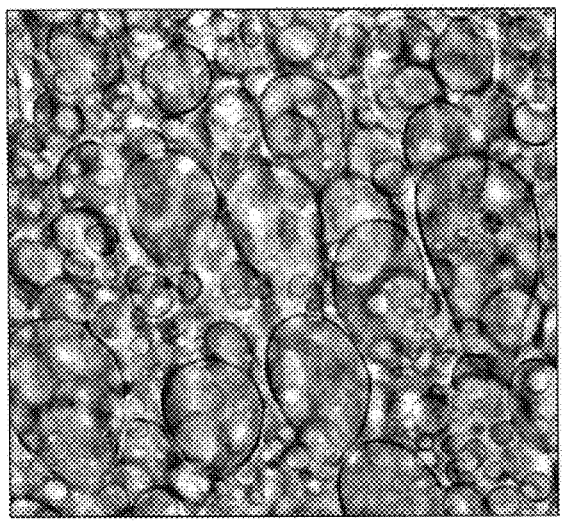
40μ  *Fig. 5a*  *Fig. 5b*

COMPATIBILIZED PRESSURE-SENSITIVE ADHESIVES

CROSS REFERENCE TO RELATED APPLICATIONS

This application is a divisional of U.S. Ser. No. 09/499,831 filed Feb. 8, 2000, now U.S. Pat. No. 6,379,791 the disclosure of which is herein incorporated by reference.

TECHNICAL FIELD

This invention relates to multi-component pressure-sensitive adhesives. More specifically, this invention relates to composite pressure-sensitive adhesives containing two main polymer components, which may be present in different layers in a multilayer structure or as a mixture.

BACKGROUND

Pressure-sensitive adhesives are well known in the art for bonding to a variety of materials such as glass, metals, painted surfaces, plastics, and the like. Multilayer films, both with and without pressure sensitive adhesive layers, have been described as, for example, films having tear or puncture resistance or mirror-like properties, and tapes. Intermediate layers have been described for use in multi-layered constructions to adhere different polymeric materials that otherwise have insufficient interlayer adhesion. Intermediate layers, or tie layers, generally have an affinity for both of the principal layers. Blends of otherwise incompatible polymers also have been produced using compatibilizers.

DISCLOSURE OF INVENTION

Briefly, the present invention provides a composite pressure-sensitive adhesive (PSA) comprising from about 95 to about 5 parts by weight of an acrylic pressure-sensitive adhesive; from about 5 to about 95 parts by weight of an at least partially soluble (in a solvent) polymer selected from the group consisting of a butadiene-containing polymer, an isoprene-containing polymer, a saturated olefin-containing polymer, and a styrene-containing polymer; and a compatibilizer present in the composite pressure-sensitive adhesive in an amount greater than 0 to about 10 parts by weight of the composite pressure-sensitive adhesive, the compatibilizer having a structure selected from the group consisting of (1) an acrylic adhesive-compatible segment and a polymer-compatible (i.e., compatible with the polymer of the composite PSA) segment wherein at least a portion of the compatibilizer is present substantially throughout either the acrylic adhesive, the polymer, or both, and (2) an acrylic adhesive-reactive segment and a polymer-compatible segment wherein at least a portion of the compatibilizer is present substantially throughout the polymer.

In this description, "compatible" means that materials form thermally stable non-equilibrium morphologies during processing that do not significantly coalesce into separate phases or increase in domain size upon aging at temperatures at or above the glass transition temperatures (Tg) or melting transition temperatures (Tm) of the materials.

A "compatible mixture" refers to a material capable of forming a dispersion in a continuous matrix of a second material, or capable of forming a co-continuous polymer dispersion of both materials.

"Compatibilizer" means a material comprising less than about 10 weight percent of at least one phase of a system having two or more phases, that improves the interfacial adhesion between two otherwise immiscible material phases. The compatibilizer is present throughout at least one phase, it is preferentially present at an interface between at least two of the phases, and it increases the compatibility of at least two of the phases in the system. If the weight ratio of the compatibilizer in the system is too high relative to the other phases, a portion of it may separately form a distinct phase.

"Miscible" as used for a polymer blend, means any blend having a free energy of mixing less than zero, and "immiscible" as used for a polymer blend, means any blend having a free energy greater than zero. A miscible polymer is capable of forming a blend with a second material, which blend appears to be a single phase with no apparent phase separation, and such capability may depend on the temperature of the blend.

"Reactive" means that components are capable of forming a chemical bond, which may be covalent or ionic.

"Copolymer" means a block, graft or random copolymer.

"Crosslink" means an element, group, or compound that attaches two chains of polymer molecules, primarily through chemical bonding.

"Continuous" means an uninterrupted phase of a component; "discontinuous" means a discrete phase dispersed within a continuous phase; and "co-continuous" means a multiphase morphology of a dispersion or blend of two or more components, wherein each component in the blend is essentially continuous in nature, and the pattern(s) of one or more phases may be irregular or complex.

The present invention provides improved adhesive properties including 180° peel adhesion, cohesive strength, shear strength, and a non-equilibrium morphology that is more thermally stable than similar compositions without compatibilizer. The present invention also provides improved interlayer adhesion in multilayer embodiments of the invention. The present invention further provides improved layer stability when multilayer embodiments are aged at elevated temperatures.

BRIEF DESCRIPTION OF THE DRAWINGS

FIG. 5(a) is a digital image of an optical micrograph taken at 250× magnification showing the morphology of an adhesive similar to that shown in FIGS. 4(a) and 4(b), without compatibilizer.

FIG. 5(b) is a digital image of an optical micrograph taken at 250× magnification showing the morphology of the adhesive shown in FIG. 5(a) after exposure to 160° C. for one hour.

DETAILED DESCRIPTION

Figure 1A:
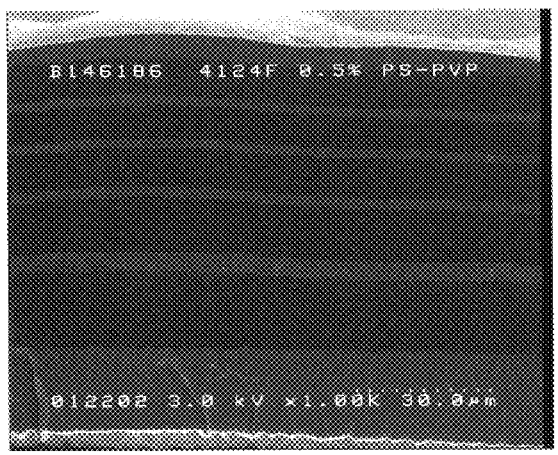
FIG. 1(a) is a cross-sectional digital image of a scanning electron micrograph taken at 1000× magnification showing the morphology of a 13-layer composite PSA of the present invention.

Adhesives normally bond by surface attachment to other substances, which includes adhesives. A PSA displays permanent and aggressive tackiness to a variety of substrates by applying only light pressure. An accepted quantitative description of a PSA is given by the Dahlquist criterion (see Handbook of Pressure-Sensitive Adhesive Technology, Second Edition, D. Satas, ed., Van Nostrand Reinhold, New York, N.Y., 1989, pages 171–176), which indicates that materials having a storage modulus (G') of less than about $3 \times 10^5$ Pascals (measured at 10 radians/second at room temperature, about 22° C.) have PSA properties, while materials having a G' above this value do not. More specifically, a PSA as used herein refers to a material that has a storage modulus below the Dahlquist criterion at the use temperature, which may be different than room temperature.

The composition of a particular adhesive may be tailored to a selected use. To accomplish this, PSAs require a balance of viscous and elastic properties resulting in a balance of adhesion, cohesion, and elasticity. These properties are measured by known methods, including shear, peel, and tack testing. PSAs generally comprise elastomers that are inherently tacky, elastomers that are tackified with the addition of tackifying resins, or thermoplastic elastomers that are tackified with the addition of tackifying resins. PSAs can be blended with solvent, coated, and the solvent removed, such as by drying at elevated temperatures. PSAs may also be coated without using solvents, such as by extrusion processing. For some applications, PSAs can be modified by crosslinking to obtain a desired balance of properties.

Acrylic PSAs generally have a glass transition temperature of about −20° C. or lower. Such acrylic adhesives may comprise from 100 to 80 weight percent (wt %) of a $C_3$–$C_{12}$ alkyl ester component, for example, isooctyl acrylate, 2-ethylhexyl acrylate, and n-butyl acrylate, and from 0 to 20 wt % of an ethylenically-unsaturated component such as, for example, acrylic acid, methacrylic acid, ethylene vinyl acetate, and N,N-dimethylacrylamide. Preferably, the acrylic PSA comprises from 0 to about 20 wt % of acrylic acid and from 100 to about 80 wt % of isooctyl acrylate. The acrylic PSAs can be polymerized by techniques including, but not limited to, solvent polymerization, emulsion polymerization, suspension polymerization, and solventless bulk polymerization. The $C_3$–$C_{12}$ alkyl ester component and the optional ethylenically-unsaturated component may also comprise a polymerization initiator, especially a thermal initiator or a photoinitiator of a type and in an amount effective to polymerize the acrylic PSA. The acrylic PSAs may be inherently tacky at the use temperature, or tackified. Useful tackifiers for acrylics include aliphatic resins, aromatic resins, rosin esters, and terpene resins.

In the present invention, a compatibilizer can have a structure including an acrylic adhesive-compatible segment and a polymer-compatible segment that permits the compatibilizer to be blended into the acrylic adhesive, the polymer, or both. Alternatively, a compatibilizer can have a structure including an acrylic adhesive-reactive segment and a polymer-compatible segment that allows the compatibilizer to be blended into the polymer but not the acrylic adhesive. When the compatibilizer is blended into another component, it is typically present substantially throughout that component. The concentration of compatibilizer in the component in which it is blended (a first component) need not be uniform throughout the component, in order to be present substantially throughout that component (e.g., the concentration at an interface of the first component with a second component may be greater than the concentration of the compatibilizer in the bulk of the first component).

A preferred compatibilizer for the present invention is a composition having the formula R—Y, which may be a copolymer, wherein Y is a segment selected from the group consisting of a) at least one alkyl (meth)acrylate ester, wherein the alkyl group contains from 1 to about 20 carbon atoms, and b) at least one functional group capable of undergoing an ionic interaction or covalent reaction with the acrylic adhesive component of the composite PSA. R is a segment selected to correspond to the polymer in the composite PSA. More specifically, R is a butadiene-containing segment when a butadiene-containing polymer is selected for the adhesive composite. Correspondingly, R is an isoprene-containing segment when an isoprene-containing polymer is selected for the adhesive composite, and R is a styrene-containing segment when a styrene-containing polymer is selected for the adhesive composite.

In the compatibilizer having the formula R—Y, when R is a saturated olefin-containing segment, Y is a segment having at least one functional group capable of undergoing an ionic interaction or covalent reaction with the acrylic adhesive component of the composite PSA.

When the chosen compatibilizer is a composition having the formula R—Y, Y is preferably a segment having at least 70 parts of at least one polymerizable monomer of an alkyl acrylate, alkyl methacrylate, or mixtures thereof, and from greater than 0 to 30 parts of at least one polar monomer selected from the group consisting of acrylic acid, methacrylic acid, itaconic acid, maleic acid, N-vinyl pyrrolidone, N-vinyl caprolactam, acrylamide, t-butyl acrylamide, N,N-(dimethylamino)ethyl acrylamide, N,N-dimethyl acrylamide, N,N-dimethyl methacrylamide, N-vinylpyridine, and mixtures thereof. The monomers are polymerizable via an addition mechanism, including anionic and/or free radical mechanisms.

Another preferred Y segment contains at least one functional group capable of undergoing an ionic interaction or covalent reaction with the acrylic adhesive component of the composite PSA. When the selected polymer is butadiene-containing, isoprene-containing, or styrene-containing, this functional group is selected from the group consisting of carboxylic acid, sulfonic acid, phosphoric acid, hydroxy, lactam, lactone, N-substituted amide, N-substituted amine, anhydride, epoxide, isocyanate, carbamate, and mixtures thereof. When the selected polymer is a saturated olefin-containing polymer, this functional group is an amine selected from the group consisting of 3-dimethylaminopropyl amine, N,N-dimethylethylenediamine, 2-(2-aminoethyl)pyridine, 1-(2-aminoethyl)pyrrolidine, 3-aminoquinuclidine, and mixtures thereof.

When the composite adhesive includes butadiene-containing polymers, the preferred compatibilizer is selected from the group consisting of butadiene-4-vinylpyridine copolymer, butadiene-isooctyl acrylate copolymer, butadiene-2-vinylpyridine copolymer, butadiene-isooctyl acrylate-acrylic acid copolymer, butadiene-(meth)

acrylamide copolymer, butadiene-acrylic acid copolymer, butadiene-N-(3-aminopropyl)methacrylamide copolymer, butadiene-N,N-(dimethylamino)ethylacrylate, butadiene-2-diethylaminostyrene copolymer, butadiene-glycidylmethacrylate copolymer, butadiene-2-hydroxyethylmethacrylate copolymer, butadiene-N-vinylpyrrolidone copolymer, and mixtures thereof.

When the composite adhesive includes an isoprene-containing polymer, the preferred compatibilizer is selected from the group consisting of isoprene-4-vinylpyridine copolymer, isoprene-isooctyl acrylate copolymer, isoprene-2-vinylpyridine copolymer, isoprene-isooctyl acrylate-acrylic acid copolymer, isoprene-(meth)acrylamide copolymer, isoprene-acrylic acid, isoprene-N-(3-aminopropyl)methacrylamide copolymer, isoprene-N,N-(dimethylamino)ethylacrylate copolymer, isoprene-2-diethylaminostyrene copolymer, isoprene-glycidylmethacrylate copolymer, isoprene-2-hydroxyethylmethacrylate copolymer, isoprene-N-vinylpyrrolidone copolymer, and mixtures thereof.

When the composite adhesive includes a saturated olefin-containing polymer, the preferred compatibilizer is the product of a reaction between a polyolefin having an anhydride, epoxide, or acid functionality, and an amine selected from the group consisting of 3-dimethylaminopropyl amine, N,N-dimethylethylenediamine, 2-(2-aminoethyl)pyridine, 1-(2-aminoethyl)pyrrolidine, 3-aminoquinuclidine, and mixtures thereof.

When the composite adhesive includes a styrene-containing polymer, the preferred compatibilizer is selected from the group consisting of styrene-4-vinylpyridine copolymer, styrene-isooctyl acrylate copolymer, styrene-2-vinylpyridine copolymer, styrene-isooctyl acrylate-acrylic acid copolymer, styrene-(meth)acrylamide copolymer, styrene-acrylic acid copolymer, styrene-N-(3-aminopropyl) methacrylamide copolymer, styrene-N,N-(dimethylamino) ethylacrylate copolymer, styrene-2-diethylaminostyrene copolymer, styrene-glycidylmethacrylate copolymer, styrene-2-hydroxyethylmethacrylate copolymer, styrene-N-vinylpyrrolidone copolymer, and mixtures thereof.

The preferred level of compatibilizer ranges from greater than 0 to about 10 parts by weight of the composite pressure-sensitive adhesive. However, when melt-processing is used to produce the composite PSAs of the present invention, a more preferred compatibilizer range is 0.1 to about 2 wt %. As the compatibilizer level in some embodiments of the present invention is increased above about 2%, the composite PSA becomes more difficult to draw down into a thin film.

In some embodiments, a compatibilizer that is not a product of a reaction between the acrylic pressure-sensitive adhesive and the polymer is preferred.

The polymer component of the inventive composite PSA may be inherently tacky at the use temperature, or may be tackified (i.e., the polymer may itself be a PSA). Useful tackifiers may depend upon the particular polymer, but generally include aliphatic resins, aliphatic olefin-derived resins, aromatic resins, hydrogenated hydrocarbons, polyaromatics, polyterpenes, rosin esters, terpene phenolic resins derived from petroleum or terpentine sources, and terpene resins.

The polymer component of this invention is also at least partially soluble in a good solvent or cosolvent. That is, at least 1 wt % of the polymer component dissolves in the solvent, preferably at least 5 wt %, more preferably at least 10 wt %. Most polymer components used in the present invention dissolve well beyond these amounts, with many completely dissolving. The amount of the polymer component that dissolves may be determined from known methods. For example, percent gel methods used in the adhesive art are useful to determine the amount of a polymer that is soluble if it does not completely dissolve. Such a method is taught in U.S. Pat. No. 5,859,088.

The polymer component of this invention may be partially crosslinked. In these cases, a portion of the polymer will still be soluble in a good solvent. Some materials may need to be processed before use to improve solubility or reduce melt viscosity. Isoprene containing systems like natural rubber are one such example. Because of the high molecular weight (MW) and gel content of some grades of natural rubber, only a small percentage of the material may be soluble. To improve solubility in this situation, the MW and gel content may be reduced using known processing techniques.

Some polymers, such as polyolefins, are known to be difficult to solvate. However, under the right conditions solvation can be accomplished. For instance, polyethylene will become soluble in chlorobenzene at elevated temperatures (e.g., 100° C.). This is also within the scope of this invention.

It is well known in the art that the extent of gelation for crosslinked polymer systems is related to the amount of crosslinking agent utilized during a polymerization process. If too much crosslinking agent is used the system can form a gel. Typically, this can occur when as little as 0.5 parts by weight of crosslinking agent is added to the formulation. In any case, these systems still typically contain a small fraction of soluble polymer chains until the crosslinker concentration or crosslink density is high enough to insure that every polymer chain has been incorporated into the network structure. Common agents that form crosslinks during the polymerization include di- and multi-functional monomeric species (e.g., divinylbenzene, ethyleneglycoldimethacrylate, and trimethylol propane triacrylate). Polymer components of this invention may contain crosslinks as long as they retain some degree solubility in a good solvent. However, this stipulation is only placed on the polymer component before it is processed into a PSA construction. The overall composite PSA of this invention does not need to meet this solvation criterion.

Butadiene-containing polymers include, for example, styrene-containing copolymers such as acrylonitrile/styrene and acrylonitrile/butadiene/styrene for example Tyril™ 100 and Magnum AG™ 700 (from Dow Chemical Co., Midland, Mich. (Dow)); styrene-butadiene-styrene block copolymers such as Kraton™ 1118 (from Shell Chemical Co., Houston, Tex. (Shell)); and polybutadiene such as Diene™ 645 (from Firestone Synthetic Rubber & Latex Co., Akron, Ohio).

Isoprene-containing polymers include, for example, linear, radial and star styrene-isoprene-styrene block copolymers such as Kraton™ 1107 (from Shell), synthetic polyisoprenes such as Natsyn™ 2210 (from Goodyear Tire and Rubber Co., Akron, Ohio) natural rubbers such as CV-60 a controlled viscosity grade of rubber, and random copolymer rubbers such as Ameripol Synpol 1011A (from Ameripol Synpol Co., Port Neches, Tex.).

Saturated olefin-containing polymers include, for example, polyolefins such as isotactic polypropylene, low density polyethylene, linear low density polyethylene, very low density polyethylene, medium density polyethylene, high density polyethylene, polybutylene, and non-elastomeric polyolefins such as ethylene/propylene copolymers and blends thereof; ethylene-vinyl acetate copolymers such as those available as Elvax™ 260 (from DuPont, Wilmington, Del.); ethylene/poly-α-olefin copolymers such as Engage™ 8200 (from Dow); and linear, radial, and star styrene-ethylene/butylene-styrene block copolymers such as Kraton™ 1657 (from Shell).

Styrene-containing polymers include, for example, linear, radial, and star styrene-isoprene-styrene, styrene-butadiene-styrene, and styrene-ethylene/butylene-styrene block copolymers such as Kraton™ 1107, 1118, and 1657, respectively (from Shell); polystyrene and high-impact polystyrene for example Styron™ 615 and 484, respectively, (from Dow); and styrene-containing copolymers. Useful star-block copolymers include those taught in U.S. Pat. Nos. 5,296,547 and 5,412,031, which are herein incorporated by reference.

Other materials can be added to the acrylic PSA and/or to the polymer, for special purposes. For example fillers, pigments, antioxidants, ultraviolet light (UV) stabilizers, plasticizers, and crosslinkers or curing agents may be included in amounts sufficient to achieve the desired results.

Pigments and fillers can be used in the polymer, acrylic PSA, or both, to modify cohesive strength and stiffness, cold flow, and tack, as well as chemical resistance and gas permeability. For example, aluminum hydrate, lithopone, whiting, and the coarser carbon blacks such as thermal blacks also increase tack with moderate increase in cohesion. Whereas clays, hydrated silicas, calcium silicates, silico-aluminates, and the fine furnace and thermal blacks increase cohesive strength and stiffness. Platy pigments and fillers, such as mica, graphite, and talc, are preferred for acid and chemical resistance and low gas permeability. Other fillers can include glass or polymeric beads or bubbles, metal particles, fibers, and the like. Each of these additives is used in an amount sufficient to produce the desired result. Typically, pigments and fillers are used in amounts of about 0.1 to about 20 wt %, based on the total weight of the composite PSA.

Antioxidants and/or ultraviolet light (UV) stabilizers may be used to protect against environmental aging caused by ultraviolet light or heat. These include, for example, hindered phenols, amines, and sulfur and phosphorus hydroxide decomposers. These antioxidants and stabilizers are used in an amount sufficient to produce the desired result. Typically, they are used in amounts of about 0.1 to about 5.0 wt %, based on the total weight of the composite PSA.

Plasticizers can be used in the polymer, acrylic PSA, or both to lower the modulus and Tg of the material in which plasticizer is mixed. They can be used to modify the strength and stiffness, cold flow, and tack properties.

Crosslinkers such as bis(aziridines) or the equivalent, benzophenone, derivatives of aziridine and benzophenone, and substituted aziridines and benzophenones such as 1,1-isophtaloyl-bis(2-methylaziridine) or acryloyloxybenzophenone (which has been copolymerized with the acrylate adhesive monomers and then irradiated) may also be added. Such crosslinkers may be activated thermally, or with a radiation source, such as UV or electron-beam radiation, preferably after coating the composite PSA to the desired thickness. These crosslinkers are used in an amount sufficient to produce the desired result, which is normally an increase in shear strength. Typically, crosslinkers are used in amounts of about 0.1 to about 5.0 wt %, based on the total weight of the composite PSA.

Ultraviolet crosslinkers are preferably activated with long wavelength UV radiation (280–400 nm). The absorption maximum will depend on the molecular structure of the crosslinking agent. High-intensity and low intensity UV lights are useful. Such high-intensity UV lights and processors are commercially available, for example from PPG, Pittsburgh, Pa. and Fusion UV Systems, Inc., Gaithersburg, Md. Low-intensity UV lights are available as germicidal lamps.

Electron beam radiation may be used to crosslink the composite PSA of the present invention. An electron beam apparatus includes an electron beam source that directs electrons into the material to be crosslinked. The electron beam source may be any electron beam source that emits electron beam radiation sufficient to achieve a desired degree of crosslinking in the particular composite PSA material selected. The typical electron beam apparatus provides a dose of 5 to 100 kiloGray (kGy) (0.5 to 10.0 Mrad) with electrons under an accelerating potential of 30 to 300 kiloVolts (kV). Manufacturers of suitable electron beam radiation sources include Energy Sciences Inc., in Wilmington, Mass., and RPC Industries, in Hayward, Calif.

The composite PSA of the present invention may comprise a layered form, a blend of materials as the overall form, or a layered form wherein one or more layers comprises a blend of two or more materials.

The materials within the composite PSA of the present invention can have any one of several types of phase morphologies. The materials may form a continuous phase; one material may form a discontinuous phase dispersed within a continuous phase of another material; and a blend of two or more of the components may form a co-continuous multiphase morphology, wherein each material in the blend is essentially continuous in nature. The different phase morphologies may be present as an overall blend. One or more layers of a layered composite PSA may have the same or different phase morphology of another material layer. That is, in an AB-layered composite PSA, layer A may have a continuous, discontinuous, or co-continuous morphology, while layer B may independently have a continuous, discontinuous, or co-continuous morphology.

These composite PSAs are prepared by melt processing (e.g., extruding) or by solvent casting. The materials used to prepare the composite PSAs of the present invention are melt processable when they are fluid or pumpable, and they do not significantly degrade or gel at the temperatures used to melt process (e.g., extruding or compounding) the composite PSA (e.g., about 50° C. to about 300° C.). Preferably, such materials have a melt viscosity of about 10 poise to about 1,000,000 poise, as measured by capillary melt rheometry at the processing temperatures and shear rates employed in extrusion. Typically, suitable materials possess a melt viscosity within this range at a temperature of about 175 to 225° C. and a shear rate of about 100 seconds$^{-1}$.

Melt processing is the preferred method for the layered form of this invention. The layers are generally formed at the same time while in a molten state, and then cooled. Preferably, the layers are substantially simultaneously melt-processed, and more preferably, the layers are substantially simultaneously co-extruded. Preferably, the total thickness of all the layers is no greater than about 250 μm thick (more preferably, no greater than about 150 μm, and most preferably, no greater than about 50 μm). Such layered composite PSAs have a construction of at least 2 layers (preferably at least 5 layers) to about 100 layers. More preferably, layered composite PSAs have at least 13 layers. Depending on the materials and any additives chosen, layer thickness, and processing parameters used, for example, the layered composite PSAs will typically have different properties at different numbers of layers. That is, the same property (e.g., peel adhesion, shear strength, tensile strength) may go through maximum at a different number of layers for a particular set of materials when compared to another set of materials. Any crosslinking agent used must be stable at the temperatures used to melt process the composite PSA. Preferred crosslinking processes for melt-processed composite PSAs include electron beam and UV methods.

Layered composite PSAs can include an $(AB)_n$ form, with either A and/or B layers as the outermost layers (e.g., $(AB)_nA$, $(BA)_nB$, or $(AB)_n$), and preferred layered forms include $A(BA)_5BA$ and $ACBC(ACBC)_5A$. In such forms, A, B and C (if present) are layers of different polymers, at least one of which is a PSA, provided that at least one outermost layer is a PSA, and at least one of which layers includes a compatibilizer present substantially throughout the layer. In each of these forms, n is preferably at least 2, and more preferably, at least 5, and is selected depending on the materials used and the application desired. A lower number of layers may be preferred for one set of materials while a higher number of layers is preferred for another set of materials.

A lower number of layers is often preferred for a microlayer composite PSA that is difficult to coextrude. Interfacial instabilities can occur at the interfaces when the microlayer composite PSA is being coextruded, which leads to an irregular surface and probably layer breakup. In these cases, a fewer number of layers provides less opportunity for interfacial instabilities and more stable coextrusion. A higher number of layers is preferred for microlayer composite PSA systems where a stiff thermoplastic is a component in the construction. By increasing the number of layers in the construction, the thickness of each individual layer is reduced, which imparts ductility to the stiff polymer. This provides improved compliance and higher adhesion for the composite PSA.

The present invention allows one to incorporate otherwise incompatible materials in a small number of layers. For example, when a compatibilizer is blended into one or more layers of a five-layer composite PSA, each layer can contribute properties to the overall construction without the need for devoting two layers to separate tie layer compositions. This advantage greatly increases the flexibility in material selection with only five layers.

When the number of layers is increased, such as with more than 10 layers, the adhesive component can have much greater interfacial contact with layers of other materials to reduce delamination between layers. Surprisingly, the composite PSA of the present invention can provide advantages of higher shear strength without compromising peel adhesion, and also have improved thermal stability when the compatibilizer is used in a multilayer PSA. As the number of layers is increased, the overall thickness of the composite PSA may or may not be increased.

Layered composite PSAs of the present invention can be made using a variety of equipment and a number of melt-processing techniques (typically, extrusion techniques) well known in the art. Such equipment and techniques are disclosed, for example, in U.S. Pat. No. 3,565,985 (Schrenk et al.), U.S. Pat. No. 5,427,842 (Bland et al.), U.S. Pat. No. 5,599,602 (Leonard et al.), and U.S. Pat. No. 5,660,922 (Herridge et al.). For example, single- or multi-manifold dies, full moon feedblocks (such as those described in U.S. Pat. No. 5,389,324 to Lewis et al.), or other types of melt processing equipment can be used, depending on the number of layers desired and the types of materials extruded. For extruding pressure sensitive adhesives, for example, slab feed extruders are typically used.

For example, one technique for manufacturing layered composite PSAs of the present invention can use a coextrusion technique, such as that described in U.S. Pat. No. 5,660,922 (Herridge et al.). In a coextrusion technique, various molten streams are transported to an extrusion die outlet and joined together in proximity of the outlet. Extruders are in effect the "pumps" for delivery of the molten streams to the extrusion die. The precise extruder is generally not critical to the process. A number of useful extruders are known and include single and twin screw extruders, batch-off extruders, and the like. Conventional extruders are commercially available from a variety of vendors such as from Berlyn Extruders (Worcester, Mass.), Bonnot Manufacturing (Uniontown, Ohio), Killion Extruders (Cedar Grove, N.J.) and Leistritz Corp. (Sommerville, N.J.).

Other pumps may also be used to deliver the molten streams to the extrusion die. These include drum loaders, bulk melters, gear pumps, and the like, and are commercially available from several sources such as Graco LTI (Monterey, Calif.), Nordson (Westlake, Calif.), Industrial Machine Manufacturing (Richmond, Va.), and Zenith Pumps Div., Parker Hannifin Corp. (Sanford, N.C.).

Typically, a feedblock combines the molten streams into a single flow channel. The distinct layers of each material can be maintained with the laminar flow characteristics of the streams. The molten structure then passes through an extrusion die, where the molten stream is reduced in height and increased in width to provide a relatively thin and wide construction. This type of coextrusion is used to manufacture composite PSA forms having about 10 layers or more.

However, the use of a feedblock is optional, as a variety of coextrusion die systems are known. For example, multimanifold dies may also be employed, such as those commercially available from Cloeren Co. (Orange, Tex.) and EDI (Chippewa Falls, Wis.). In multimanifold dies, each material flows in its own manifold to the point of confluence. In contrast, when feedblocks are used, the materials flow in contact through a single manifold after the point of confluence. In multimanifold die or feedblock manufacturing, separate streams of material in a flowable state are each split into a predetermined number of smaller or sub-streams. These smaller streams are then combined in a predetermined pattern of layers to form an array of layers of these materials in a flowable state. The layers are in intimate contact with adjacent layers in the array. This array generally comprises a stack of layers which is then compressed to reduce its height. In the multimanifold die approach, the adhesive width remains constant during compression of the stack, while the width is expanded in the feedblock approach. In either case, a comparatively thin, wide adhesive film results. Layer multipliers in which the resulting adhesive film is split into a plurality of individual subfilms which are then stacked one upon another to increase the number of layers in the ultimate adhesive film may also be used. The multimanifold die approach is typically used in manufacturing composite PSA forms having less than about 10 layers.

In manufacturing the layered composite PSAs, the materials may be fed such that either the acrylic PSA or the polymer material forms the outermost layers. When the polymer material is selected for the outermost layers, it too, must be a PSA. The two outermost layers are often formed from the same material, preferably the acrylic PSA. The materials comprising the various layers are preferably processable in the same range of temperatures.

Significantly, although it has been generally believed that the melt viscosity of each of the various layers should be similar, i.e., the ratio of their viscosities within a range of about 1:1 to about 2:1 at the selected process temperature, this is not a necessary requirement of the methods and products of the present invention. However, concerns with encapsulation of one material within another where the layer ratios are not uniform across the channel, suggest the viscosity ratio should generally not be greater than about 10:1. When the melt viscosities are not closely matched, the material having the lowest melt viscosity was preferred for the outer layers. Accordingly, residence times and processing temperatures may have to be adjusted independently (i.e., for each type of material) depending on the characteristics of the materials of each layer. For example, compare the extruder temperatures used in Examples 1–2, 3–10, and 11–12 in layered composite PSA forms each having 13 layers.

The process stability, or the tendency of layers to break up, depends on the volume fraction of the A and B layers, the viscosity ratios of the component polymers or polymer mixtures, and the degree of shear thinning. For example, if the outer "A" layer has a higher viscosity than the "B" layer and has the same degree of viscosity shear thinning, process stability considerations suggest that the B layer have a greater volume fraction than the A layer (i.e., above 50%). Conversely, if the A layer has a lower viscosity than the B layer and has a greater degree of shear thinning, process stability should increase if the B layer has a smaller (i.e., below 50%) volume fraction. These considerations are generally true regardless of the number of layers and the total flow rate of the process.

In melt processing polymeric multilayer composite PSAs, preferably, the difference in elastic stresses generated at the interface between the layers of different polymers are minimized to reduce or eliminate flow instabilities that can lead to layer breakup. With knowledge of the elasticity of a material, as measured by the storage modulus on a rotational rheometer over a range of frequencies (0.001 radians/s<$\omega$<100 radians/s) at the processing temperature, along with its viscosity at shear rates or frequencies less than 0.01 $s^{-1}$ (or a region in which the viscosity is constant with respect to shear rate or frequency) and the degree to which the viscosity of the material shear thins, one of skill in the art can make judicious choices for the relative thickness of the layers, the die gap, and the flow rate to obtain a film with continuous, uniform layers. Generally, the ratio of the viscosity to the storage modulus at 0.01 $s^{-1}$ for the more viscous polymer should be greater than that of the less viscous polymer. Adding compatibilizer as required in the present invention broadens the process window and contributes to more stable and uniform layers.

Referring now to FIGS. 1(*a*) and 1(*b*), a cross-sectional magnified view (at 1000 and 1500×, respectively) of two layered adhesives, each containing acrylic PSA layers and styrene-containing polymer layers, is shown. FIG. 1(*a*) shows one embodiment of the present invention, a composite PSA that includes a compatibilizer. This compatibilizer includes a styrene-compatible segment, and an acrylic adhesive-compatible segment. The inventive composite PSA exhibits uniform layering and stability throughout the melt processing. In contrast, FIG. 1(*b*), which includes no compatibilizer, shows uneven layering and less stability.

Other manufacturing techniques, such as lamination, coating, or extrusion coating may be used in assembling layered composite PSAs and products from such layered composite PSAs according to the present invention. For example, in lamination, the various layers of the construction are brought together under temperatures and/or pressures (e.g., using temperature-controllable laminating rollers or a press) sufficient to adhere adjacent layers to each other.

In extrusion coating, a first layer is extruded onto a backing such as a cast web, a uniaxially-oriented film, or a biaxially-oriented film, and subsequent layers are sequentially coated onto the previously provided layers. Extrusion coating may be preferred over the melt coextrusion process described above if it is desirable to pretreat selected layers of the multilayer film or if the materials are not readily processed by coextrusion. Extrusion coating may be used to provide a barrier coat between the composite PSA of the present invention and a backing material, such as an acrylic foam tape.

Continuous forming methods include drawing the composite PSA out of a film die and subsequently contacting a moving plastic web or other suitable backing. After forming, the composite PSA coatings are cooled and can be solidified more rapidly by quenching using either direct methods, such as chill rolls or water baths, or indirect methods, such as air or gas impingement, or both.

Solvent casting may also be used to prepare the articles of the present invention. This method typically employs a common solvent, selected for compatibility with the acrylic pressure-sensitive adhesive component, the polymer component, and the compatibilizer component. Such common solvents include, for example, toluene and tetrahydrofuran. Specific selection of a common solvent for a particular subset of the present invention is within the skill of the art.

In the solvent casting method, the materials included in the composite PSA are blended to form a uniform mixture, then coated onto a carrier web or a backing (described below) using a known coating technique such as curtain coating, die coating, knife coating, roll coating, and spray coating. A preferred coating method is knife coating. The solvent is then dried away from the coated backing, usually with the aid of a drying oven for a time and temperature selected to remove any undesirable level of residual solvent. The drying oven can activate a thermal crosslinker as well. The composite PSA is then ready for further processing or use.

Backing materials useful with the present invention are preferably flexible, and may be fabric, non-woven or woven polymeric films, metallic foils, paper, and/or combinations thereof. More specifically, film backings useful with the present invention include, for example, ethylene-propylene-diene rubbers, polyesters, polyisobutylenes, polyolefins, polyolefin-based nonwovens, polyurethanes, vinyls including polyvinylchloride and ethylene-vinyl acetate, and/or combinations thereof. For particular purposes, the backing may be coated, one or both major surfaces, with a primer or a release agent, which may be a low-adhesion backsize (LAB) material. For example, when using a plasticized polyvinylchloride (PVC) backing, an embodiment of the present invention comprising a butadiene- or isoprene-containing polymer along with a polyisoprene-polyvinylpyridine (PI-PVP) compatibilizer has a particular advantage in that the composite PSA has an affinity for acidic PVC.

Still other backings useful in the present invention include acrylic-containing foam, polychloroprene-containing foam, polyolefin-containing foam, and polyurethane-containing foam, among others. Preferred foamed backings can be prepared as described in U.S. Pat. Nos. 4,223,067 and 4,415,615, which are herein incorporated by reference. In one such backing, glass microbubbles are uniformly dispersed into a polymerizable mixture. The mixture is then radiation polymerized, with heat or ultraviolet energy. In another backing, a polymerizable composition is frothed, coated onto a backing, and polymerized to achieve a cellular structure having at least 15% voids by volume. Also, the backing can be foamed and polymerized without first frothing. Another preferred foam backing material is 5666 Acrylic Foam Tape (available from Minnesota Mining and Manufacturing Company (3M), St. Paul, Minn.).

Figure 2:
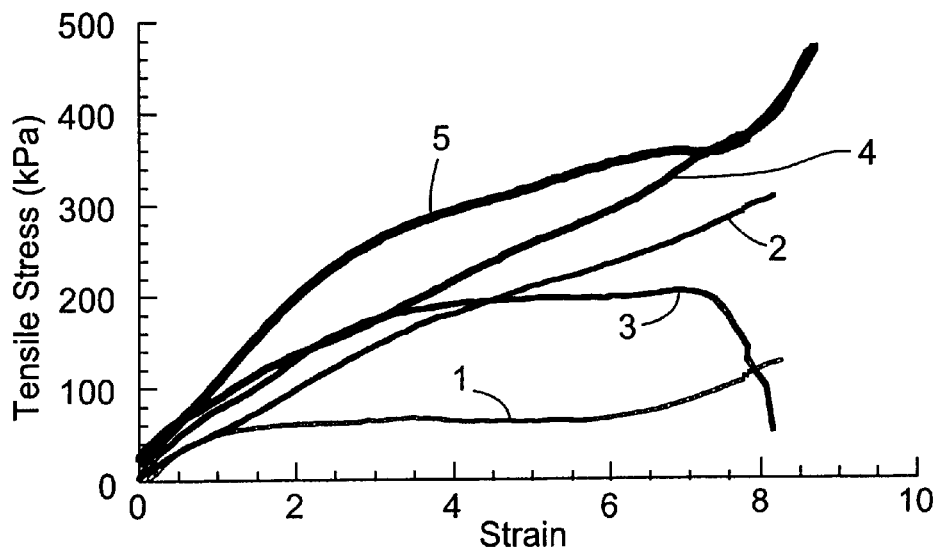
FIG. 2 is a graph depicting the tensile stress versus strain for two composite PSAs of the present invention, along with two adhesives without compatibilizer at 50° C.
Figure 3:
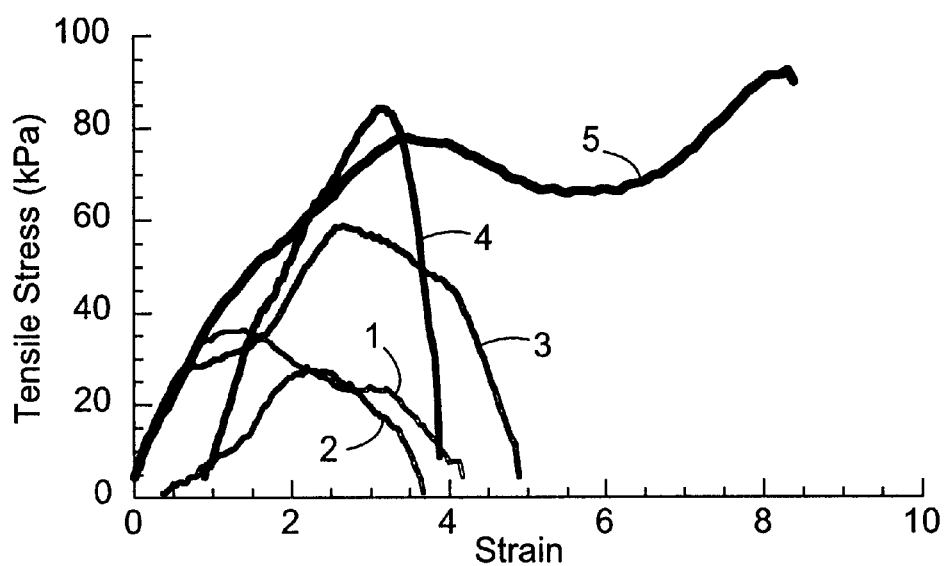
FIG. 3 is a graph depicting the tensile stress versus strain of the adhesives shown in FIG. 2, at 100° C.

The composite PSAs of the present invention have improved mechanical properties, as compared to adhesive compositions that are similar except having no compatibilizer. The stress-strain profiles of inventive adhesive compositions and comparative adhesive compositions at two temperatures are shown in FIGS. 2 and 3. These figures compare five different adhesives, of which two are embodiments of the present invention. Line 1 on the graph was an adhesive made from equal parts of Kraton™ 1107 and Escorez™ 1310; Line 2 was PSA A as described below; Line 3 was a 13-layer adhesive in an A(BA)$_5$BA form using the material from Line 1 as the "B" layer and PSA A (Line 2) as the "A" layer, described below as Comparative Example 1; Line 4 was the same as Line 3, except the B layer included one wt % of a polyisoprene-poly-4-vinylpyridine (PI-PVP) compatibilizer, described below as Example 1; and Line 5 was the same material as Line 3, except that the B layer included one wt % of a polystyrene-poly-4-vinylpyridine (PS-PVP) compatibilizer.

In FIG. 2, the mechanical properties of these adhesives are compared at 50° C. The strain in percent is plotted against the tensile stress in kilopascals (kPa). This graph shows that the composite PSAs of the present invention, which include compatibilizer (Lines 4 and 5), exhibit improved tensile properties when compared to both the uncompatibilized layered adhesive (Line 3, Comparative Example 1) and even the homopolymer PSAs (Lines 1 and 2). FIG. 3 shows these same compositions tested at 100° C., where one compatibilized (with PS-PVP) layered adhesive (Line 5) demonstrated much better mechanical properties than the pure component PSAs, the uncompatibilized layered adhesive (Line 3), and the layered adhesive containing the PI-PVP compatibilizer (Line 4, Example 1), which has a lower Tg segment (polyisoprene rather than polystyrene).

Generally, adding compatibilizer in small amounts to at least one component of a PSA having at least two components clearly improved the adhesive properties of the composite PSA thus formed, when compared to a similar composition having no compatibilizer. These property improvements become apparent during typical adhesive testing, such as peel adhesion and static shear testing. The cohesive strength of a composite PSA can be improved enough to shift the failure mode of a PSA tape, in shear and/or peel, from cohesive to adhesive. This means that the bond to a substrate is not weakened, while the composite PSA is much stronger than a PSA having no compatibilizer, and the overall effect is better peel and shear properties.

Figure 4A:
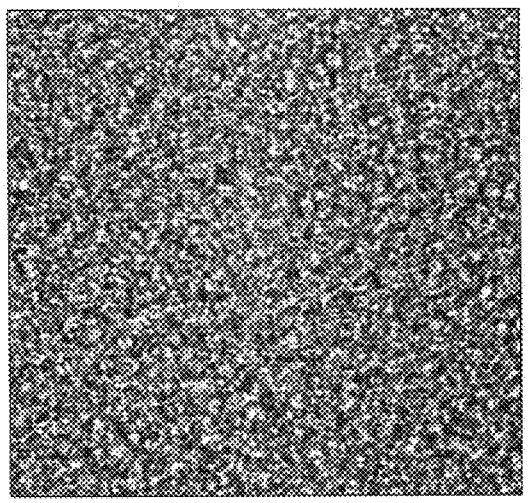
FIG. 4(a) is a digital image of an optical micrograph taken at 250× magnification showing the morphology of a composite PSA of the present invention.

The composite PSAs of the present invention also exhibit less coalescence upon aging than similar adhesives having no compatibilizer. The morphology of one composite PSA of the present invention is shown in FIG. 4(a). This composite PSA was exposed to 160° C. for one hour, after which the image shown in FIG. 4(b) was taken. A comparison of these images leads to the conclusion that the inventive PSA morphology appears stable. FIG. 5(a) shows the morphology of an adhesive similar in composition to that shown in FIGS. 4(a) and (b), but having no compatibilizer. FIG. 5(a) shows larger phase domains, as compared to FIG. 4(a). The FIG. 5(b) image is the same adhesive of FIG. 5(a) after exposing the adhesive to 160° C. for one hour. The dramatic increase in the size of the phase domains indicates much lower aging stability.

Figure 6A:
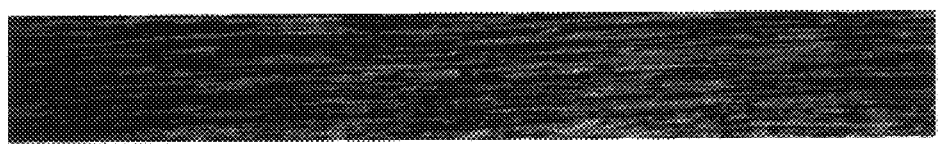
FIG. 6(a) is a cross-sectional digital image of a scanning electron micrograph taken at 500× magnification showing the morphology of another composite PSA of the present invention.
Figure 6B:
FIG. 6(b) is a cross-sectional digital image of a scanning electron micrograph taken at 500× magnification of the adhesive shown in FIG. 6(a) without compatibilizer.

FIG. 6 compares cross-sectional digital images of scanning electron micrographs taken at 500× magnification showing the morphology of another adhesive pair. In FIG. 6(a) a composite PSA of the present invention is shown. In FIG. 6(b) an adhesive similar in composition but without compatibilizer is shown. The finer structure with smaller phase domains in FIG. 6(a) indicates one advantage of this invention.

Therefore, this invention is useful in PSA articles having improved 180° peel adhesion, improved shear strength, improved interlayer adhesion, improved stability in coextruded layers, and reduced coalescence upon aging.

Objects and advantages of this invention are further illustrated by the following examples, but the particular materials and amounts thereof recited in these examples, as well as other conditions and details, should not be construed to unduly limit this invention.

EXAMPLES

This invention is further illustrated by the following examples, which are not intended to limit the scope of the invention. In the examples, all parts, ratios and percentages are by weight unless otherwise indicated. The following test methods were used to characterize the pressure sensitive adhesive compositions in the examples.

Test Methods

180° Peel Adhesion Test

PSA composite samples having a size of 1.25 centimeters (cm) wide and 15 cm long were tested for 180° peel adhesion to substrates of glass, smooth cast biaxially oriented polypropylene (PP) films, and/or stainless steel (SS) plates. The PSA samples were adhered to the test substrate surfaces using four passes of a 2.1-kilogram (kg) roller. After aging at controlled temperature and humidity conditions (approximately 22° C., 50% relative humidity) for approximately 24 hours, the tapes were tested using a Model 3M90 slip/peel tester (from Imass, Inc., Accord, Mass.) in 180° geometry at 30.5 centimeter/minute (cm/min) peel rate, unless otherwise noted. Where noted, some samples were also aged at a controlled temperature of approximately 22° C. for approximately 1 week and tested as above. The failure mode was noted as adhesive (A), cohesive (C), or mixed cohesive and adhesive (M).

Cold Temperature Peel Adhesion

The peel adhesion of the samples to a stainless steel substrate was determined at various temperatures according to the ASTM Standard Methods of Testing Pressure-Sensitive Adhesive-Coated Tapes Used for Electrical Insulation, ASTM D1000–79, Procedure A. The peel rate used in this test was 30.5 cm/min (12 in/min). The failure mode was noted as adhesive, cohesive, or mixed (cohesive and adhesive).

Room Temperature Shear Strength Test

Shear strength, as determined by holding time, was measured on PSA composite samples at controlled temperature and humidity conditions (approximately 22° C., 50% relative humidity). PSA samples having a size of 12.5 mm×12.5 mm were adhered to a stainless steel sheet with four passes of a 2.1-kg roller. A 1000-gram weight was hung from each sample. The amount of time for the weight to drop was recorded. If a sample did not drop, the test was stopped after 10,000 minutes. The failure mode was noted as adhesive pop-off (P) if the sample detached from the surface or cohesive (C) if the adhesive split.

Elevated Temperature Shear Strength Test

Shear strength, as determined by holding time, was also measured on PSA composite samples at specified elevated temperatures (e.g., 70° C.) and controlled humidity conditions (approximately 50% relative humidity). PSA samples having a size of 25.4 mm×25.4 mm were adhered to high-density polyethylene sheet with the pressure of four passes of a 2.1-kg roller. The sample was allowed to dwell on the substrate for 20 minutes before performing the test. Either a 750 or 500 gram weight was hung from each sample. The amount of time for the weight to drop was recorded. The failure mode was noted as pop-off (P) or cohesive (C). If a sample did not drop, the test was stopped after 10,000 minutes.

Morphology

The morphology of the pressure-sensitive composites was analyzed using optical microscopy. Small samples (about 1 cm by 1 cm) were transferred from a release coated paper liner onto a glass microscope slide and covered with a glass cover slip. The samples were imaged at a magnification of 250× using an Olympus BH2 optical microscope fitted with a digital camera and an image analysis software package (all from LECO Corp., St. Joseph, Mich.). The initial morphology was imaged and the samples were subsequently annealed in a vacuum oven maintained at 160° C. The morphology development was monitored over time, at this temperature.

Alternatively, the morphology of composite PSA samples was determined using scanning electron microscopy (SEM). Sample cross-sections were microtomed using a diamond knife in a liquid nitrogen bath. The resulting samples were treated with osmium tetraoxide vapors for 30 minutes at ambient temperature (about 22° C.) to differentially stain the isoprene component of the block copolymer phase of the blend. The samples were imaged at various magnifications using a JEOL model 820 SEM (available from JEOL Corp., Japan) operating at 10 kV. Stained phases appeared white in these micrographs with the detector used (backscattering electron imaging).

Tensile Test

The tensile test was used to obtain stress-strain data for PSA composites. PSA samples having a width of 1.25 cm and a thickness of 500 to 750 micrometers ($\mu$m) were made by repeatedly laminating PSA composite samples having an initial thickness about 50 $\mu$m. The resulting samples were tested at various temperatures (25 to 150° C.) using a Sintech Model 20 (available from MTS Systems Corp., Eden Prairie, Minn.) equipped with a temperature control chamber (ATS Series 2000 temperature controller available from Applied Test Systems, Inc., Butler, Pa.). The raw data was analyzed using TestWorks for Windows version 3.06 software package (from MTS Systems Corp.). A 4.5-kg (10-lb.) load cell was used in these tests. All samples were tested at a crosshead speed of 50 cm/min. Samples were tested along the machine direction.

Materials Used

PSA A: 95 parts isooctyl acrylate (IOA)/5 parts acrylic acid (AA), water emulsion polymerized, shear viscosity—150 Pa-s, prepared according to U.S. Pat. No. RE 24,906, and dried.

PSA B: A suspension polymerized acrylic pressure sensitive adhesive was prepared in accordance with U.S. Pat. No. 4,833,179 (Young et al.) as follows. A 2-liter (L) split reactor equipped with condenser, thermowell, nitrogen inlet, stainless steel motor-driven agitator, and a heating mantle with temperature control was charged with 750 grams (g) deionized water, to which was added 2.5 g zinc oxide and 0.75 g hydrophilic silica (CAB-O-SIL EH-5, available from Cabot Corp., Cambridge, Mass.) and was heated to 55° C. while purging with nitrogen until the zinc oxide and silica were thoroughly dispersed. At this point, a charge of 480 g isooctyl acrylate, 20 g methacrylic acid, 2.5 g azobisisobutyronitrile (AIBN) initiator (VAZO 64, available from DuPont, Wilmington, Del. (DuPont)) and 0.5 g isooctyl thioglycolate chain transfer agent were mixed together. The resulting solution with initiator and chain transfer agent was then added to the initial aqueous mixture while vigorous agitation (700 rpm) was maintained to obtain a good suspension. The reaction was continued with nitrogen purging for at least 6 hours, during which time the reaction was monitored to maintain a reaction temperature of less than 70° C. The resulting pressure sensitive adhesive was collected and dried to at least 90% solids by weight.

PSA C: 90 parts IOA/10 parts AA, solution polymerized, inherent viscosity—0.7, prepared according to U.S. Pat. No. RE 24,906, and dried.

PSA D: 95 parts IOA/5 parts AA, solution polymerized, inherent viscosity—0.7, prepared according to U.S. Pat. No. RE 24,906, and dried.

PSA E: 93 parts IOA/7 parts AA, polymerized in a polyethylene shell as described in U.S. Pat. No. 5,804,610 (Hamer et al.). This formulation also contained 0.1 parts acryloyloxybenzophenone, a UV-activated crosslinking reagent.

PSA F: 57.5 parts IOA/35 parts methyl acrylate/7.5 parts AA, solution polymerized, inherent viscosity—0.7, prepared according to U.S. Pat. No. RE 24,906, and dried.

Kraton™ D1107: A styrene-isoprene block copolymer commercially available from Shell Chemical Co., Houston, Tex. (Shell).

Escorez™ 1310: A C5 aliphatic hydrocarbon tackifying resin commercially available from Exxon Chemical Co., Houston, Tex. (Exxon).

LDPE 1550P: Low density polyethylene commercially available from Dow Chemical Co. (Dow), Midland, Mich.

LLDPE 2517: Linear low density polyethylene available from Dow.

Styron™ 484: High impact polystyrene (HIPS), available from Dow.

Styron™ 615: Polystyrene (PS), available from Dow.

Styron™ 666D: Polystyrene (PS), available from Dow.

Bynel™ 50E561: Maleic anhydride grafted polypropylene, available from DuPont.

Escorene™ 3445: Isotactic polypropylene, available from Exxon.

Solprene™ 411: A radial styrene-butadiene block copolymer having 30% styrene content, available from INSA, Houston, Tex.

Solprene™ 1205: A linear random-block styrene-butadiene copolymer having 25% styrene content, available from INSA.

Piccolyte™ A135: An alpha-pinene resin tackifier available from Hercules, Inc., Wilmington, Del.

Shellflex™ 371: A naphthenic oil having 10% aromatics available from Shell.

Ethanox™ 330: A 1,3,5-trimethyl-2,4,6-tris(3,5-di tert-butyl-4-hydroxybenzyl)benzene antioxidant from Ethyl Corp., Houston, Tex.

Compatibilizer A: Polyisoprene-block-4-vinylpyridine diblock copolymer (Degree of Polymerization, ((DP)PI=440, (DP)PVP=10) synthesized using anionic polymerization techniques in a batch reactor. Isoprene, cyclohexane, and 4-vinylpyridine were purified by passage through a column of activated basic aluminum oxide (Brockmann I, available from Aldrich Chemical Co., Milwaukee, Wis.) and purged with argon and stored in a sealed flask at −20° C. until use. Isoprene (340 g, 5 mol) was charged into a dry 5 L round bottomed flask fitted with septum and magnetic stirbar. Cyclohexane (2 L) was subsequently charged into the flask. The resulting solution was purged vigorously with argon (research grade) for 10 min. A solution of sec-butyllithium (9.3 mL of a 1.3M solution in cyclohexane) was charged into the flask. Tetrahydrofuran (10 mL) was subsequently added to promote the reaction, and a light yellow color became apparent. The solution was stirred (with ice-water cooling bath to control the reaction exotherm) for 3 h. Then 4-vinylpyridine (17.1 g, 0.163 mol) was charged into the flask with vigorous stirring. The solution immediately became deep red in color. After 5 min., isopropyl alcohol (10 mL) was added to quench the reaction. The resulting polymer was poured into 15 L of isopropyl alcohol to precipitate the polymer. The polymer was collected and dried under vacuum for 24 h to give a clear elastomer.

Compatibilizer B: PS-b-PVP synthesized using anionic polymerization techniques in a stirred tubular reactor previously described in U.S. Pat. No. 5,644,007. An initiator slurry was prepared by mixing 1884.64 ml of 1.3M sec-butyl lithium solution in 4823.79 g of oxygen-free cyclohexane (Aldrich Chemical Co.) and stirred at room temperature for about 30 minutes. Purified styrene monomer and purified toluene solvent were pressure fed or pumped (at rates of 136.11 g/min and 154.90 g/min, respectively) into the first zone of a 10 L stirred tube reactor (described in U.S. Pat. No. 5,644,007). The initiator slurry, continuously stirred under nitrogen to prevent stratification and oxygen contamination, was simultaneously introduced with the monomer and solvent feeds at a rate of 19.64 ml/min using a peristaltic pump into the first zone of the 10 L reactor. The overall solids loading of this reaction was 44% in styrene monomer. A color change (orange-red) was observed in zone 1 when the initiator slurry contacted the monomer. An exotherm in the first zone which was held at a constant temperature (65° C.) by adjusting the jacket temperature of zone 1 with ambient temperature circulating water. The temperatures of zones 1 through 5 of the STR were individually maintained at 65, 40, 40, 40, and 20° C., respectively. The living polymerization of styrene was allowed to proceed through the first 3 zones in a plug-like fashion, facilitated by stirring paddles along the reaction path over a period of approximately 20 min, at which point all of the styrene monomer was consumed. At the start of zone 4, purified 4-vinylpyridine was added (at a rate of 15.0 g/min) resulting in another color change (to deep red) and was allowed to polymerize for approximately 7 minutes in this zone. The polymerization was subsequently quenched using either 2-propanol or hindered phenol thermal stabilizer (e.g., Irganox 1076 antioxidant, from Ciba-Geigy Corp. Greensboro, N.C.) in zone 5. The resulting viscous solution was fed into a Discotherm B™ devolatilizer (from List AG, Acton, Mass.). The polymer solution was then devolatilized under vacuum (0.53–2.67 kPa; 4–20 torr) at 130° C., and hot-melt extruded. The overall residence time for these reactions was 30–35 minutes. The molecular weight characteristics for this block copolymer were determined using gel permeation chromatography (GPC) analysis, with a styrene standard, and were as follows: Mn=28.8 kg/mol, polydispersity index (PDI)=1.69. The block copolymer composition was determined using nuclear magnetic resonance (NMR) spectroscopy and was found to be: 88.9% PS: 11.1% PVP.

Compatibilizer C: Aliphatic amine-terminal polystyrene synthesized by using anionic polymerization techniques as described in the literature by Cernohous, et al., Macromolecules, 1998, 31, 3759–63. The resulting amine-terminal polystyrene samples molecular weight characteristics were determined to be as follows: Mn=19.7 kg/mol, PDI=1.10. It was also found that over 98% of this material had a single aliphatic amine at the chain end by both titration and $^1$H NMR analysis.

Compatibilizer D: A random copolymer of 80 parts IOA, 5 parts AA, and 15 parts styrene made in accordance with U.S. Pat. No. 5,753,768.

Compatibilizer E: A random macromer copolymer of 92 parts IOA, 4 parts AA, and 4 parts polystyrene macromer made in accordance with U.S. Pat. No. 4,693,776.

Compatibilizer F: Aminated polyethylene with 0.9 wt % amination was made by melt mixing maleic anhydride-functionalized polyethylene (Fusabond™ MB-226D, available from DuPont) with 3-dimethylaminopropyl amine (from Aldrich Chemical Co.) at 250° C. for approximately 10 minutes in a corotating twin screw extruder. A polymer filament output from the extruder die was directed into a water bath to quench the filament. Then the filament was passed over a roll of paper toweling to partially dry it, after which the polymer filament was pelletized.

Aziridine Crosslinker: 1,1-isophtaloyl-bis(2-methylaziridine) available from Minnesota Mining and Manufacturing Company, St. Paul, Minn. (3M).

Macromelt™ 6240: A polyamide resin from Henkel, Inc., Elgin, Ill.

Examples 1–2, Comparative Example 1

Examples 1–2 illustrate the effect that the of addition of a compatibilizer had on the properties of pressure-sensitive adhesive (PSA) composite having an A(BA)$_5$BA multilayered construction.

In Example 1, a polymer, formed by melt-mixing 50 parts Kraton™ D1107 and 50 parts Escorez™ 1310, and four parts compatibilizer, Compatibilizer A, were premixed into an "A" stream. The mixture of polymer and compatibilizer was fed by a corotating twin-screw extruder (34-mm Leistritz model LSM 34 GL, L/D of 42/1, available from Leistritz Corp., Sommerville, N.J.) operating with zone temperatures increasing from 150° C. to 204° C. into the "A" channels of a thirteen layer feedblock (made as in U.S. Pat. No. 4,908,278). An acrylic pressure-sensitive adhesive, PSA A, was fed into a "B" stream by a single screw extruder (50-mm Bonnot Model 2WPKR, from Bonnot Manufacturing, Uniontown, Ohio), operating with zone temperatures increasing from 162° C. to 177° C. into the inner six "B" channels of the feedblock. The "A" and "B" streams were merged in the feedblock into a multilayered flow stream that was passed through a single 25 cm (10 inch) wide orifice film die (from Extrusion Dies, Inc. (EDI), Chippewa Falls, Wis.) and drop cast onto a 51 μm thick polyethyleneterephthalate (PET) film. This yielded 78 parts PSA A (I), 22 parts polymer (II) and 1 part Compatibilizer A (III) in the overall composition. A release liner was applied to the exposed surface of the cast adhesive layer, and the combination was passed over a chill roll to form a multilayer PSA composite sandwiched between a single layer PET film and a release liner. The temperatures of the feedblock; die and chill roll were set at 154, 150 and 18° C., respectively, and the line speed was about 8.4 meters per minute (m/min.). The PSA composite had an overall measured thickness of 150 µm and a calculated material weight ratio of PSA A to polymer to compatibilizer of 78:22:1.

Example 2 was made as in Example 1 except that the amount of Compatibilizer A was increased to give 3 parts Compatibilizer A per 100 parts of the total composition. The line speed for Example 2 was reduced to 4.6 m/min. to result in a composite PSA having a thickness of about 425 µm.

Comparative Example 1 was made substantially as in Example 1 except that no compatibilizer was used.

All examples were tested for 180° peel adhesion (with a surface of either glass or polypropylene (PP)) and room temperature shear strength. All shear strength samples failed cohesively. The results are shown in Table 1, where the material ratio is PSA A (I), polymer (II), and Compatibilizer A (III).

TABLE 1

| Ex. | Material Ratio I:II:III | Surface | Thickness (µm) | Peel (N/dm) | Peel Failure Mode | RT Shear (min.) |
|---|---|---|---|---|---|---|
| 1 | 78:22:1 | Glass | 147 | 83.1 | C | 165 |
| 2 | 78:22:3 | Glass | 425 | 148.2 | C | 75 |
| CE 1 | 78:22:0 | Glass | 150 | 34.1 | C | 19.6 |
| 1 | 78:22:1 | PP | 147 | 81.1 | A | — |
| 2 | 78:22:3 | PP | 425 | 145.9 | A | — |
| CE 1 | 78:22:0 | PP | 150 | 46.7 | C | — |

The data in Table 1 indicates that peel adhesion more than doubled when as little as 1 wt % of compatibilizer was used. In addition, the shear strength increased over 8 times when as little as 1 wt % compatibilizer was included in the composite PSA.

Examples 3–10, Comparative Examples 2–3

Examples 3–10 illustrate the effect of the type of compatibilizer and the use of electron beam curing on the properties of another PSA composite having 13 layers in the form of A(BA)$_5$BA.

Examples 3–6 were made in a manner similar to Example 1 except that PSA B was used in place of PSA A, different types and amounts of compatibilizers were used, and some process conditions were changed. The material ratio used was 78 parts PSA B to 22 parts polymer. The compatibilizer type and amount per 100 parts of the total composition are shown in Table 2. The line speed was varied to achieve a total PSA composite thickness as reported in Table 2. The temperatures of the feedblock and the die were set at 154° C. and 149° C., respectively.

Comparative Example 2 was made in a manner similar to Example 3 except no compatibilizer was used and the line speed was varied to achieve a thickness similar to Examples 3–6. The overall thickness was varied by changing the line speed from 3.7 in/mm. for Examples 3, 4, 5 and 6 to 7.6 m/min. for Comparative Example 3.

Examples 7–10 and Comparative Example 3 were as Examples 3–6 and Comparative Example 2 except that they were irradiated with an electron beam, exposing each composite to 50 kiloGray (kGy) at 175 kiloVolts (kV).

Examples 3–10 and Comparative Examples 2 and 3 were tested for 180° peel adhesion to glass and the failure mode was noted. The results are shown in Table 2.

TABLE 2

| | Compatibilizer | | Thickness | Peel to glass | Failure |
|---|---|---|---|---|---|
| Ex. | Type | Parts | µm | N/dm | Mode |
| 3 | B | 0.5 | 58 | 20.6 | C |
| 4 | C | 0.5 | 62.5 | 18.4 | M |
| 5 | D | 5.0 | 80 | 16.9 | M |
| 6 | E | 5.0 | 80 | 12.0 | A |
| CE 2 | none | — | 87.5 | 19.3 | C |
| 7 | B | 0.5 | 58 | 25.0 | A |
| 8 | C | 0.5 | 62.5 | 29.8 | A |
| 9 | D | 5.0 | 80 | 18.3 | A |
| 10 | E | 5.0 | 80 | 23.9 | A |
| CE 3 | none | — | 87.5 | 22.4 | C |

As shown in Table 2, the type and amount of compatibilizer can have a dramatic effect on the adhesive properties. Adding Compatibilizer C and D to PSA B, in Examples 4 and 5, changed the failure mode from cohesive to mixed, relative to Comparative Example 2. Adding 5% of Compatibilizer E to PSA B changed the failure mode to adhesive. The differences in peel were significantly impacted by the peel mode, with the peel of Comparative Example 2 being a measurement of adhesive splitting.

As shown by Examples 7–10, relative to Examples 3–6, electron beam curing dramatically increased the interlayer and peel adhesion in these composite PSAs. The uncompatibilized Comparative Example 3 was impacted little by electron beam curing and still suffered from cohesive failure during the peel test. Each of the compatibilized examples had increased peel adhesion values after curing. For example, Compatibilizer C present at only 0.5 wt % (Examples 4 and 8) increased peel adhesion from 18.4 N/dm to 29.8 after electron beam curing. In addition, the failure modes of each composite PSA after electron beam curing was adhesive, rather than cohesive or mixed.

While the peel adhesion of Example 9 was not higher than that of Comparative Example 3, there was an improvement in that the failure mode changed from cohesive to the preferred failure mode, adhesive.

Figure 1B:
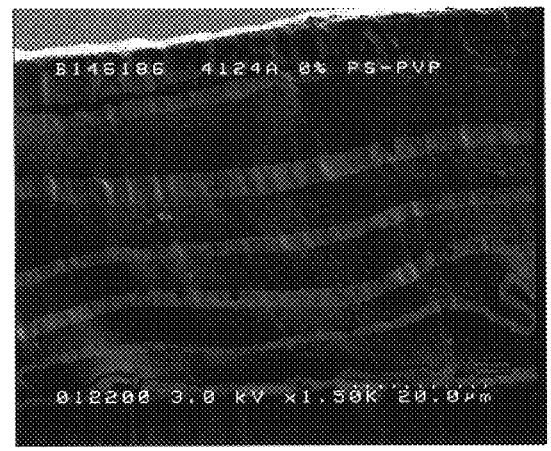
FIG. 1(b) is a cross-sectional digital image of a scanning electron micrograph taken at 1500× magnification of the adhesive shown in FIG. 1(a) without compatibilizer.

The addition of compatibilizer also promoted the generation of more uniform layers in this microlayer form of composite PSA. FIGS. 1(a) and 1(b) are scanning electron micrographs for cross-sections of compatibilized Example 3 and uncompatibilized Comparative Example 2. The layered structure in Example 3 appears more uniform than that in Comparative Example 2.

Examples 11–12, Comparative Examples 4–5

Examples 11–12 illustrate the effect of material weight ratio on the properties of a PSA composite having an A(BA)$_5$BA multi-layer form.

Examples 11–12 were made substantially as Example 1 except the polymer was Styron™ 484 HIPS, the compatibilizer was Compatibilizer B, the calculated material ratios were different, the polymer was fed into the "B" channels of the feedblock, the acrylic PSA into the "A" channels, and process conditions were changed. The calculated material ratios of the PSA, the polymer and the compatibilizer for Examples 11 and 12 were 90:10:1 and 93:7:1, respectively. The temperature of the feedblock and die for each example was increased to 204° C. and the line speed was decreased to 3.7 m/min to result in a total composite thickness for each example as reported in Table 3.

Comparative Examples 4 and 5 were made as in Examples 11 and 12, respectively, except that each contained no compatibilizer.

Examples 11–12 and Comparative Example 4–5 were tested for 180° peel adhesion to glass and RT shear strength. The results are shown in Table 3.

TABLE 3

| Ex. | Material Ratio | Thickness (µm) | Peel to glass (N/dm) | Peel Failure Mode | RT Shear (min.) | Shear Failure Mode |
|---|---|---|---|---|---|---|
| 11 | 90:10:1 | 50 | 17.6 | A | 39.6 | C |
| CE 4 | 90:10:0 | 63 | 6.3 | A | 7.5 | C |
| 12 | 93:7:1 | 75 | 28.0 | A | 25.7 | C |
| CE 5 | 93:7:0 | 75 | 9.7 | A | 5.4 | C |

The data in Table 3 shows that peel adhesion increased around 300% when 1% of Compatibilizer B was added into the PSA composite, and the shear strength increased.

Example 13 and Comparative Example 6

Example 13 illustrates the effect of different compatibilizers on PSA properties in a composite having 13 layers in an $A(BA)_5BA$ form.

Example 13 was made as in Example 1 except that the polymer and compatibilizer were different, the material weight ratio was changed, the polymer was fed into the "B" channels of the feedblock, the acrylic PSA into the "A" channels, and some process conditions were altered. The polymer was LLDPE and the compatibilizer was Compatibilizer F. The material weight ratio of PSA A, polymer, and Compatibilizer F was 97:3:3. The line speed was 3.7 m/min.

Comparative Example 6 was made as Example 13 except that no compatibilizer was present, the material weight ratio of PSA to polymer was 97:3 and the line speed was increased to 5.2 m/min to achieve a thickness similar to Example 13.

These examples were tested for peel 180° peel adhesion to glass and room temperature shear strength. The data is shown in Table 4.

TABLE 4

| Example | Material Ratio | Thickness (µm) | Peel to glass (N/dm) | Failure Mode |
|---|---|---|---|---|
| 13 | 97:3:3 | 92.5 | 42.2 | A |
| CE 6 | 97:3:0 | 92.5 | 11.9 | C |

The data illustrated the pronounced effect of adding compatibilizer to the composite. Peel adhesion was increased more than 275% and the failure mode switched from cohesive to adhesive when a compatibilizer was added to the composite.

Examples 14–15 and Comparative Example 7–8

Examples 14–15 illustrate the effects of compatibilizer in PSA composites having 25 layers of an $ACBC(ACBC)_5A$ form, where A, B, and C are layers of different polymers, of which at least A is a PSA.

In Example 14, an adhesive, PSA B, was fed by a single screw extruder (Bonnot Model 2WPKR), operating with zone temperatures increasing from 177 to 188° C. into the "A" channels of a 25 layer feedblock. A polymer composed of a dry-blend mixture of 38 parts Styron™ 484 HIPS and 50 parts Stryon™ 615 PS, was fed in a ratio of 88 parts of the polymer mixture and 12 parts of a compatibilizer, Compatibilizer B, with a single screw extruder equipped with gear pump (19 mm Killion KLB-075, L/D=32, from Killion Extruders, Cedar Grove, N.J.), operating with zone temperatures increasing from 160 to 232° C., into the "B" channels of the feedblock. Another material, a mixture of 80 parts Kraton™ D1107 and 20 parts Escorez™ 1310 was fed with a single screw extruder with a gear pump at the extruder discharge (51 mm, Berlyn 2 Extruder, L/D of 32/1, available from Berlyn Extruders, Worcester, Mass.) operating with zone temperatures increasing from 49 to 177° C., into the "C" channels of the feedblock. The streams were merged in the feedblock into a multi-layered flow stream that was passed through a single orifice film die 46 cm (18 inches) wide (from EDI). The flow stream was drop cast between two release liners as they passed over a chill roll, contacting one release liner, to produce a multilayer form. The temperatures of the feedblock, die and chill roll were set at 188, 188 and 52° C., respectively, and the line speed was 4.3 m/min. The multilayer film had an overall measured thickness of approximately 85 µm. The calculated material ratio of PSA B in the A layer, to material in the B layer, to polymer in the C layer was 66:8:26. Within layer B, the ratio of polymer to compatibilizer was 88:12. Thus, the overall ratio of combined polymer and adhesive to compatibilizer was 99:1.

Example 15 was made as Example 14 except conditions were adjusted to achieve a calculated material ratio of layer A: layer B: layer C of 48:5:47. Within layer B, the ratio of polymer to compatibilizer was 88:12. The overall ratio of combined polymer and adhesive to compatibilizer was therefore 99.4:0.6.

Comparative Examples 7 and 8 were made as Examples 15 and 16, respectively, except that the polymer mixture was one part HIPS to one part PS and no compatibilizer was present.

Examples 14–15 and Comparative Examples 7–8 were tested for 180° peel adhesion to glass and room temperature shear strength. These adhesives ranged from 80 to 85 µm in thickness. The results are shown in Table 5.

TABLE 5

| Ex. | Material Ratio A:B:C | Polymer in Layer B to Compatibilizer | Peel to Glass (N/dm) | Peel to PP (N/dm) | Failure Mode (glass/PP) |
|---|---|---|---|---|---|
| 14 | 68:8:24 | 88:12 | 20.7 | 20.9 | A/A |
| CE 7 | 68:8:24 | 100:0 | 11.9 | 14.7 | A/A |
| 15 | 48:5:47 | 88:12 | 31.9 | 30.1 | A/A |
| CE 8 | 48:5:47 | 100:0 | 27.3 | 29.2 | C/C |

As seen, a multi-layered composite PSA that included another material (having compatibilizer) located between alternating regions of PSA exhibited as much as a 74% increase in peel adhesion relative to the Comparative Examples that did not contain compatibilizer. More interestingly, only adhesive failure modes were witnessed during the peel test for Examples 14 and 15 while the uncompatibilized Comparative Example 8 failed cohesively to both PP and glass surfaces.

Examples 16–21 and Comparative Examples 9–11

Examples 16–21 illustrated the effect that a compatibilizer had on the adhesive properties of blended composite PSAs.

In Example 16, 30 parts of a polymer, composed of one part Kraton™ D1107 and one part of an additive, tackifier Escorez™ 1310, was dissolved in 70 parts of a solvent, (toluene) to form a solution. To this solution was added 3 parts of a compatibilizer, Compatibilizer A. The solution was stirred for 10 minutes at 21° C. In a separate solution, 30 parts of an adhesive, PSA C was dissolved into 70 parts toluene over a period of 24 h. Then 30 parts of the Kraton™ D1107 solution was subsequently mixed with 70 parts of the PSA C solution for 24 hours at 21° C.

The resulting solution was applied with a knife coater onto one side of 35-μm thick PET substrate and placed for 10 minutes in an oven set at 70° C. to remove the solvent. The composite PSA on the substrate had a thickness of about 50 μm and a material ratio of PSA C, polymer and compatibilizer of 70:30:1.

Examples 17–21 were made as Example 16 except that the amounts of PSA C (A), polymer (B), and Compatibilizer A (C) were varied as reported in Table 6.

Comparative Examples 9–11 were made as Examples 16, 18 and 20, respectively except that no compatibilizer was included.

The examples were tested for 180° peel adhesion to glass at both 0.3 and 2.3 m/min peel rate (12 and 90 inch/min), and room temperature (RT) shear strength. The test results are shown in Table 6. All RT shear samples failed cohesively.

TABLE 6

| | Material Ratio | Peel (N/dm) | | RT Shear |
|---|---|---|---|---|
| Ex. | A:B:C | 0.3 m/min | 2.3 m/min | (min) |
| 16 | 70:30:1 | 61.4 | 80.5 | 83 |
| 17 | 70:30:2 | 61.6 | 81.4 | 101 |
| CE 9 | 70:30:0 | 59.0 | 90.9 | 61 |
| 18 | 50:50:1 | 61.8 | 86.7 | 128 |
| 19 | 50:50:2 | 63.6 | 88.7 | 147 |
| CE 10 | 50:50:0 | 58.7 | 91.5 | 402 |
| 20 | 30:70:1 | 67.1 | 99.9 | 1,152 |
| 21 | 30:70:2 | 64.2 | 93.5 | 1,680 |
| CE 11 | 30:70:0 | 56.5 | 85.1 | 2,152 |

These results showed that the peel adhesion and shear strength depend upon the composition of these solvent-borne PSAs, while the level of compatibilizer had only a small impact. The samples with 30 wt % A and 70 wt % B (Examples 20 and 21, relative to Comparative Example 11) showed improvement in peel but reductions in shear strength when compatibilizer was used. The samples with 70 wt % A and 30 wt % B (Examples 16 and 17, relative to Comparative Example 9) had similar or lower peel adhesion and higher shear when compatibilizer was used. The samples with equal parts A and B (Examples 18 and 19, relative to Comparative Example 10) showed improvement in peel adhesion at the low rate, but reductions in peel adhesion at the high rate and reductions in shear strength when compatibilizer was used.

Examples 22–23 and Comparative Example 12

Examples 22–23 illustrate the effect that heat aging had on the resulting morphology and adhesive properties in blended composite PSAs.

Examples 22–23 were made as described in Example 16 except that the amounts of compatibilizer were as shown in Table 7 (below) and samples were subsequently exposed to various aging conditions. The resulting tapes were vacuum heat-aged at a pressure of 0.67 to 2.67 kPa (5 to 20 torr) and a temperature of 160° C. for either one of three hours.

Comparative Example 12 was made as Example 22 except no compatibilizer was present.

The examples were tested for 180° peel adhesion to glass at and room temperature shear strength. The test results are shown in Table 7, where the material ratio is PSA C (A), polymer (B), and Compatibilizer A (C).

TABLE 7

| Ex. | Material Ratio A:B:C | Aging Time (h) | Peel from Glass (N/dm) | Failure Mode |
|---|---|---|---|---|
| 22A | 70:30:0.25 | 1 | 104.5 | A |
| 23A | 70:30:2 | 1 | 112.9 | A |
| CE 12A | 70:30:0 | 1 | 121.4 | A |
| 22B | 70:30:0.25 | 3 | 105.4 | A |
| 23B | 70:30:2 | 3 | 113.0 | A |
| CE 12B | 70:30:0 | 3 | 134.0 | C |

Comparing the peel adhesion (at 0.3 m/min) of Example 17 in Table 6 with Examples 23A and 23B in Table 7 showed that the peel adhesion of tapes made with composite PSAs that contained some compatibilizer did not build as rapidly with heat aging as that of tapes that did not contain compatibilizer (Comparative Examples 9, 12A, and 12B). More significantly, the composite adhesive retains the desirable adhesive failure mode, even after the adhesion to glass increases, an effect known to occur with acrylic adhesives.

Figure 4B:
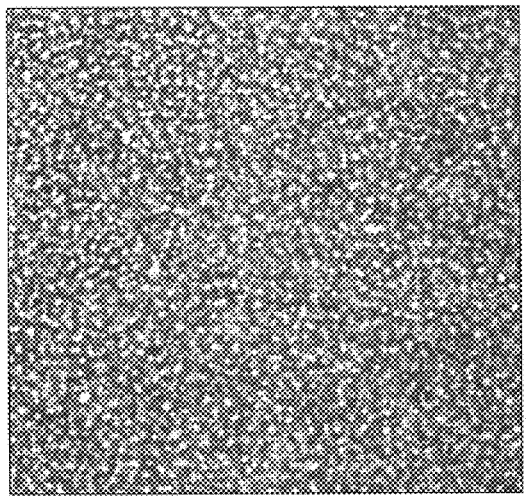
FIG. 4(b) is a digital image of an optical micrograph taken at 250× magnification showing the morphology of the composite PSA of FIG. 4(a) after exposure to 160° C. for one hour.

FIGS. 4(a) and 4(b) show the morphology of Example 23A before and after (Ex. 23B) heat aging under vacuum 0.67 to 2.67 kPa (5–20 torr) at 160° C. for one hour. FIGS. 5(a) and 5(b) show the morphology of Comparative Example 12A before and after (CE 12B) similar aging conditions. These figures clearly show that the morphology is more uniform in samples that contain compatibilizer, as compared to samples having no compatibilizer. These micrographs also demonstrated that the compatibilized blend morphology did not coarsen (i.e., the size of the phase domains did not increase) with heat aging while the uncompatibilized blend considerably coarsened. This coarsened blend also showed the undesirable shift to the cohesive failure mode, while the composite adhesive of the present invention retained the preferred adhesive failure mode even after extended heat aging.

Examples 24–25 and Comparative Example 13

Examples 24–25 illustrate the effect that a compatibilizer had on PSA properties at below-ambient temperatures in composite PSAs in forms composed of mixtures of PSA regions and polymer regions.

Examples 24–25 were made as Example 16–17, respectively except PSA D was used instead of PSA C, and the composite adhesive solutions were coated onto a release liner, dried and subsequently laminated to an stretchable backing made of plasticized polyvinylchloride (PVC) (from 3M) that was flexible at −18° C.

Comparative Example 13 was made as Example 24 except no compatibilizer was included.

The examples were tested for cold temperature peel adhesion at various temperatures. The test results are shown in Table 8, where the material ratio is PSA D (A), polymer (B), and Compatibilizer A (C).

TABLE 8

| Example | Material Ratio A:B:C | Temperature (° C.) | Peel (N/dm) |
|---|---|---|---|
| 24A | 70:30:1 | 25 | 63.8 |
| 25A | 70:30:2 | 25 | 65.8 |

TABLE 8-continued

| Example | Material Ratio A:B:C | Temperature (° C.) | Peel (N/dm) |
|---|---|---|---|
| CE 13A | 70:30:0 | 25 | 55.9 |
| 24B | 70:30:1 | −10 | 153.1 |
| 25B | 70:30:2 | −10 | 156.6 |
| CE 13B | 70:30:0 | −10 | 117.9 |
| 24C | 70:30:1 | −18 | 158.4 |
| 25C | 70:30:2 | −18 | 169.0 |
| CE 13C | 70:30:0 | −18 | 135.5 |

The data in Table 8 showed that the addition of compatibilizer had a pronounced effect on peel adhesion performance at low temperatures when a stretchable backing was used. At room temperature, the peel adhesion values of compatibilized blends was as much as 17% greater than the control. The inventive composite PSA samples were clearly superior to the comparative examples when tested at lower temperatures.

Example 26 and Comparative Example 14

Example 26 demonstrates the effect of a compatibilizer on composite PSA properties in the form of mixtures made using hot melt compounding and coating techniques.

In Example 26, 35 parts of a polymer, composed of one part Kraton™ D1107 and one part of an additive, tackifier Escorez™ 1310, was mixed with one part of a compatibilizer, Compatibilizer A, in a 300 cm³ bowl Brabender batch mixer (from Brabender Instruments, South Hackensack, N.J.) operating at 50 rpm and 160° C. for 10 min. An adhesive, PSA A, was introduced to the mixture after 5 minutes and the total mixture was then processed for 5 minutes to form a composite PSA. The composite PSA was subsequently fed by a Bonnot extruder (Bonnot Model 2WPKR, 50 mm from Bonnot Manufacturing, Uniontown, Ohio) into a twin-screw extruder (18 mm Haake Micro 18 Extruder, available from Leistritz, Corp.). The temperature was maintained at 177° C. (350° F.) in each of the six zones of the twin-screw extruder, which was continuously discharged at a pressure of at least about 0.69 MPa (100 psi) into a 15.2-cm (6-inch) wide rotary rod die. The die was maintained at 177° C. (350° F.) and the die gap was 0.5 to 0.8 mm (20 to 30 mils). The adhesive composite was coated onto a 51-μm (2-mil) thick biaxially oriented PET film and a release coated paper web was laminated onto the adhesive, all at a rate of 1.36 kg/h (3 lb/h). The construction was fed at a rate of 4.6 m/min (15 fpm) between chill rolls maintained at a temperature of 21° C. (70° F.) to form an adhesive tape with a composite PSA layer thickness of about 50 μm (2.0 mils). Alternatively, some blended composite PSA was fed between two release-coated paper webs for further testing of the composite PSA layer or subsequent transfer of the composite PSA layer to a different substrate.

Comparative Example 14 was made as Example 26 except no compatibilizer was added.

The examples were tested for 180° peel adhesion to glass in the down-web and cross-web directions and RT shear. The test results are shown in Table 9, where the material ratio is PSA A (A), polymer (B), and Compatibilizer A (C).

TABLE 9

| Ex. | Material Ratio A:B:C | Down-Web Peel (N/dm) | Cross-Web Peel (N/dm) | Shear Strength (min) |
|---|---|---|---|---|
| 26 | 65:35:1 | 84.5 | 55.2 | 6.5 |
| CE 14 | 65:35:0 | 55.8 | 46.0 | 2.3 |

The Table 9 data showed that the peel adhesion values observed for the blended composite PSA was as much as 52% higher than the uncompatibilized blend. In addition, the anisotropic peel adhesion characteristic was more pronounced in the inventive composite PSA, showing a difference of 53 percent versus only 21 percent for the uncompatibilized comparative example. Scanning Electron Micrographs (SEM) of these two different systems are shown in FIGS. 6(a) and 6(b). These micrographs show that the domains for the compatibilized blend were more oriented and continuous in nature as compared to the uncompatibilized blend.

Examples 27–34 and Comparative Examples 15–18

Example 27–34 demonstrate the effect of a compatibilizer on the adhesive properties of composite PSAs in the form of mixtures that were made using a solventless process.

In Example 27 a polymer, Styron™ 666D PS, was fed into the feed throat of a twin-screw extruder (30-mm diameter, fully-intermeshing, co-rotating extruder, L/D 37/1, available from Werner Pfleiderer Co., Ramsey, N.J.). A compatibilizer, Compatibilizer B, was fed into zone 3 of the extruder, and an adhesive, PSA E, was introduced into zone 5, to form a melt mixture having a material ratio of PSA E to polymer to Compatibilizer B of 97:2.5:0.5. The temperatures used in zones 1–6 were 149, 204, 204, 191, 191, and 191° C., respectively. The melt mixture was passed through a 25.4-cm (10-inch) wide film die (Ultraflex™ 40 die, Model 89–12939, from EDI). The die was maintained at 204° C. (400° F.) and the die gap was 0.5 to 0.8 mm (20 to 30 mils). The melt mixture was applied to a 51-μm (2-mil) differential release-coated paper liner under conditions resulting in a composite PSA thickness of about 51 μm (2 mil). The liner and composite PSA were fed at a rate of 6.4 m/min (20 fpm) between chill rolls maintained at a temperature of 21° C. (70° F.).

Example 28 was made as Example 27 except the composite PSA was further irradiated online with a dose of 500 mJ/cm² of UV radiation (high intensity UV B light source, model 14498 from UVEX Inc., Smithfield, R.I.).

Example pairs 29 & 30, 31 & 32 and 33 & 34 were made as Examples 27 & 28, with the second sample of each pair having UV exposure, except that the material (weight) ratios were 97:1:2, 85:14.5:0.5, and 85:13:2, respectively.

Comparative Examples 15–18 were made as Examples 25, 29, 31 and 33, respectively, except compatibilizer was replaced with polymer.

The examples were tested for 180° peel adhesion to glass and RT shear strength. The test results are shown in Table 10, where the material ratio is PSA E (A), polymer B, and Compatibilizer B (C).

TABLE 10

| Ex. | Material Ratio A:B:C | UV Dose (mJ/cm$^2$) | Peel (N/dm) | Shear (min) | Shear Failure Mode |
|---|---|---|---|---|---|
| 27 | 97:2.5:0.5 | 0 | 46.6 | 1.6 | C |
| 28 | 97:2.5:0.5 | 500 | 44.0 | 3980 | P |
| 29 | 97:1:2 | 0 | 49.3 | 3.7 | C |
| 30 | 97:1:2 | 500 | 40.9 | 7950 | P |
| CE 15 | 97:3:0 | 0 | 47.7 | 1.4 | C |
| CE 16 | 97:3:0 | 500 | 42.0 | 660 | C |
| 31 | 85:14.5:0.5 | 0 | 31.7 | 2.4 | P |
| 32 | 85:14.5:0.5 | 500 | 28.9 | 10,000 | none |
| 33 | 85:13:2 | 0 | 33.9 | 4.1 | C |
| 34 | 85:13:2 | 500 | 32.4 | 7405 | P |
| CE 17 | 85:15:0 | 0 | 44.7 | 2.1 | C |
| CE 18 | 85:15:0 | 500 | 37.0 | 645 | C |

As seen in Table 10, adding compatibilizer to these mixture systems improved the shear strength of the resulting tapes as much 1500% when the adhesives were irridated. In addition, the compatibilized systems that were UV-cured either did not fail the shear test or failed adhesively (pop-off), whereas the UV-irradiated uncompatibilized tapes all still failed cohesively.

Examples 35–36 and Comparative Example 19

Examples 35–36 demonstrate the effect of a chemical crosslinker on the adhesive properties of a composite PSA in the form of a mixture.

In Example 35, a polymer solution was made by dissolving 13.2 parts Solprene™ 411, 7.1 parts Solprene™ 1205, 20.3 parts Piccolyte™ A135, 2.0 parts Shellflex™ 371, and 0.4 parts Ethanox™ 330 in toluene to form a solution having 43% solids. A compatibilizer, Compatibilizer B, was added to this solution in the amount of 0.34 parts compatibilizer to 100 parts total solution, and the mixture was blended at room temperature for 15 to 30 minutes. Another solution was made by mixing an adhesive, PSA F, into a solvent mixture of 29 parts toluene and 71 parts ethyl acetate to form a solution having 25% solids.

A chemical crosslinker, 1,1-isophtaloyl-bis(2-methylaziridine) (from 3M), was added to this adhesive solution in the amount of 0.02 parts crosslinker to 100 parts total solution and mixed at room temperature for 15 to 30 minutes.

The two solutions were combined and mixed at room temperature for 30 minutes to form a composite PSA solution of 34 percent solids. This composite PSA solution was applied with a coating die onto a release liner moving at about 18.3 m/min (60 fpm), dried and crosslinked in an oven having a temperature profile of 50, 60, 70, 76° C. The composite PSA on the release liner, after drying away the solvents, had a thickness of about 50 µm and a material ratio of PSA F, polymer and Compatibilizer B of 36:64:0.5.

A barrier coat, Macromelt 6240, was extrusion-coated to a target thickness of about 25 µm (0.5 mils) onto the adhesive surface of the composite PSA immediately after the web left the last oven zone. The barrier-coated side of the construction was subsequently laminated using a hand roller at room temperature (21° C.) to an acrylic foam tape backing (No. 5666, available from 3M) to form a foamed-backed composite PSA tape. This tape was allowed to stand for at least 24 hours before testing.

Example 36 was made as Example 35 except that the material ratio of PSA F to polymer to Compatibilizer B was 36:64:1.

Comparative Example 19 was made as Example 35 except that no compatibilizer was added.

The examples were tested for elevated-temperature shear performance, 90° peel adhesion, and for peel adhesion and shear strength with a high density polyethylene substrate. The results are shown in Tables 11 and 12, where the material ratios were PSA F (A), polymer (B), and Compatibilizer B (C).

TABLE 11

| Example | Material Ratio A:B:C | Mass of Load | 70° C. Shear (min) | Failure Mode |
|---|---|---|---|---|
| 35A | 36:64:0.5 | 500 g | 10,000 | none |
| 36A | 36:64:1.0 | 500 g | 10,000 | none |
| CE 19A | 36:64:0 | 500 g | 900 | C |
| 35B | 36:64:0.5 | 750 g | 10,000 | none |
| 36B | 36:64:1.0 | 750 g | 3,500 | P |
| CE 19B | 36:64:0 | 750 g | 40 | C |

As seen in the above table, the shear strength was significantly improved with a 500 g load and more a 750 g load, relative to the uncompatibilized blend examples when only 0.5% of compatibilizer was added to the mixture form of the composite PSA. Performance improvements also were witnessed with higher compatibilizer loading.

TABLE 12

| Example | Material Ratio (A:B:C) | Peel (N/dm) | Failure Mode |
|---|---|---|---|
| 36 | 36:64:1 | 271 | Foam split |
| CE 19C | 36:64:0 | 253 | A |

As seen in Table 12, foam tape assemblies having either the composite PSA or uncompatibilized blend gave acceptable peel adhesion values. The failure mode of these tapes was adhesive in the case of the comparative example, however, in the compatibilized example split the acrylic foam core during peel, a desirable result.

These examples show that the composite PSA in these embodiments of the invention have dramatically improved shear strength, as compared to a similar adhesive having no compatibilizer, while not compromising peel adhesion.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A composite pressure-sensitive adhesive comprising:
   from about 95 to about 5 parts by weight of an acrylic pressure-sensitive adhesive;
   from about 5 to about 95 parts by weight of an at least partially soluble polymer selected from the group consisting of a butadiene-containing polymer, an isoprene-containing polymer, and a saturated olefin-containing polymer; and
   a compatibilizer present in the composite pressure-sensitive adhesive in an amount greater than 0 to about 10 parts by weight of the composite pressure-sensitive adhesive, the compatibilizer having a structure selected from the group consisting of (1) an acrylic adhesive-compatible segment and a polymer-compatible segment wherein at least a portion of the compatibilizer is present substantially throughout either the acrylic adhesive, the polymer, or both, and (2) an acrylic adhesive-reactive segment and a polymer-compatible segment wherein at least a portion of the compatibilizer is present substantially throughout the polymer.

2. A composite pressure-sensitive adhesive comprising:

from about 95 to about 5 parts by weight of an acrylic pressure-sensitive adhesive;

from about 5 to about 95 parts by weight of an at least partially soluble butadiene-containing polymer; and a compatibilizer present in the composite pressure-sensitive adhesive in an amount greater than 0 to about 10 parts by weight of the composite pressure-sensitive adhesive, the compatibilizer having the formula $R^1$—Y, wherein $R^1$ is a butadiene-containing segment and Y is a segment selected from the group consisting of: a) at least one alkyl (meth)acrylate ester, wherein the alkyl group contains from 1 to about 20 carbon atoms, and b) at least one functional group capable of undergoing an ionic interaction or covalent reaction with the acrylic adhesive component of the composite pressure-sensitive adhesive.

3. A composite pressure-sensitive adhesive comprising:

from about 95 to about 5 parts by weight of an acrylic pressure-sensitive adhesive;

from about 5 to about 95 parts by weight of an at least partially soluble butadiene-containing polymer; and a compatibilizer present in the composite pressure-sensitive adhesive in an amount greater than 0 to about 10 parts by weight of the composite pressure-sensitive adhesive, the compatibilizer having the formula $R^1$—Y, wherein $R^1$ is a butadiene-containing segment and Y is a segment comprising at least 70 parts of at least one addition polymerizable monomer selected from alkyl acrylate, alkyl-methacrylate, and mixtures thereof, and greater than 0 to 30 parts of at least one polar monomer selected from the group consisting of acrylic acid, methacrylic acid, itaconic acid, maleic acid, N-vinyl pyrrolidone, N-vinyl caprolactam, acrylamide, t-butyl acrylamide, N,N-(dimethylamino)ethyl acrylamide, N,N-dimethyl acrylamide, N,N-dimethyl methacrylamide, N-vinylpyridine, and mixtures thereof.

4. A composite pressure-sensitive adhesive comprising:

from about 95 to about 5 parts by weight of an acrylic pressure-sensitive adhesive;

from about 5 to about 95 parts by weight of an at least partially soluble butadiene-containing polymer; and a compatibilizer present in the composite pressure-sensitive adhesive in an amount greater than 0 to about 10 parts by weight of the composite pressure-sensitive adhesive, the compatibilizer having the formula $R^1$—Y, wherein $R^1$ is a butadiene-containing segment and Y comprises at least one functional group capable of undergoing an ionic interaction or covalent reaction with the acrylic adhesive component of the composite pressure-sensitive adhesive, the functional group being selected from the group consisting of carboxylic acid, sulfonic acid, phosphoric acid, hydroxy, lactam, lactone, amide, amine, anhydride, epoxide, isocyanate, carbamate, and mixtures thereof.

5. A composite pressure-sensitive adhesive comprising:

from about 95 to about 5 parts by weight of an acrylic pressure-sensitive adhesive;

from about 5 to about 95 parts by weight of an at least partially soluble butadiene-containing polymer; and a compatibilizer present in the composite pressure-sensitive adhesive in an amount greater than 0 to about 10 parts by weight of the composite pressure-sensitive adhesive, the compatibilizer being selected from the group consisting of butadiene-4-vinylpyridine copolymer, butadiene-isooctyl acrylate copolymer, butadiene-2-vinylpyridine copolymer, butadiene-isooctyl acrylate-acrylic acid copolymer, butadiene-(meth)acrylamide copolymer, butadiene-acrylic acid copolymer, butadiene-N-(3-aminopropyl) methacrylamide copolymer, butadiene-N,N-(dimethylamino)ethylacrylate, butadiene-2-diethylaminostyrene copolymer, butadiene-glycidylmethacrylate copolymer, butadiene-2-hydroxyethylmethacrylate copolymer, butadiene-N-vinylpyrrolidone copolymer, and mixtures thereof.

6. A composite pressure-sensitive adhesive comprising:

from about 95 to about 5 parts by weight of an acrylic pressure-sensitive adhesive;

from about 5 to about 95 parts by weight of an at least partially soluble isoprene-containing polymer; and a compatibilizer present in the composite pressure-sensitive adhesive in an amount greater than 0 to about 10 parts by weight of the composite pressure-sensitive adhesive, the compatibilizer having the formula $R^2$—Y, wherein: $R^2$ is an isoprene-containing segment and Y is a segment selected from the group consisting of: a) at least one alkyl acrylate ester, wherein the alkyl group contains from 1 to about 20 carbon atoms, and b) at least one functional group capable of undergoing an ionic interaction or covalent reaction with the acrylic adhesive component of the composite pressure-sensitive adhesive.

7. A composite pressure-sensitive adhesive comprising:

from about 95 to about 5 parts by weight of an acrylic pressure-sensitive adhesive;

from about 5 to about 95 parts by weight of an at least partially soluble isoprene-containing polymer; and a compatibilizer present in the composite pressure-sensitive adhesive in an amount greater than 0 to about 10 parts by weight of the composite pressure-sensitive adhesive, the compatibilizer having the formula $R^2$—Y, wherein $R^2$ is an isoprene-containing segment and Y is a segment comprising at least 70 parts of at least one addition polymerizable monomer of an alkyl acrylate, alkyl-methacrylate, or mixtures thereof, and greater than 0 to 30 parts of at least one polar monomer selected from the group consisting of acrylic acid, methacrylic acid, itaconic acid, maleic acid, N-vinyl pyrrolidone, N-vinyl caprolactam, acrylamide, t-butyl acrylamide, N,N-(dimethylamino)ethyl acrylamide, N,N-dimethyl acrylamide, N,N-dimethyl methacrylamide, N-vinylpyridine, and mixtures thereof.

8. A composite pressure-sensitive adhesive comprising:

from about 95 to about 5 parts by weight of an acrylic pressure-sensitive adhesive;

from about 5 to about 95 parts by weight of an at least partially soluble isoprene-containing polymer; and a compatibilizer present in the composite pressure-sensitive adhesive in an amount greater than 0 to about 10 parts by weight of the composite pressure-sensitive adhesive, the compatibilizer having the formula $R^2$—Y, wherein $R^2$ is an isoprene-containing segment and Y comprises at least one functional group capable of undergoing an ionic interaction or covalent reaction with the acrylic adhesive component of the composite pressure-sensitive adhesive, the functional group being selected from the group consisting of carboxylic acid, sulfonic acid, phosphoric acid, hydroxy, lactam, lactone, N-substituted amide, N-substituted amine, anhydride, epoxide, isocyanate, carbamate, and mixtures thereof, in which the N-substituents for such N-substituted amides and N-substituted amines can be C1-C4 alkyl, vinyl, dimethylaminoethyl, or aminopropyl.

9. A composite pressure-sensitive adhesive comprising:
from about 95 to about 5 parts by weight of an acrylic pressure-sensitive adhesive;
from about 5 to about 95 parts by weight of an at least partially soluble isoprene-containing polymer; and
a compatibilizer present in the composite pressure-sensitive adhesive in an amount greater than 0 to about 10 parts by weight of the composite pressure-sensitive adhesive, the compatibilizer being selected from the group consisting of isoprene-4-vinylpyridine copolymer, isoprene-isooctyl acrylate copolymer, isoprene-2-vinylpyridine copolymer, isoprene-isooctyl acrylate-acrylic acid copolymer, isoprene-(meth) acrylamide copolymer, isoprene-acrylic acid, isoprene-N-(3-aminopropyl)methacrylamide copolymer, isoprene-N,N-(dimethylamino)ethylacrylate copolymer, isoprene-2-diethylaminostyrene copolymer, isoprene-glycidylmethacrylate copolymer, isoprene-2-hydroxyethylmethacrylate copolymer, isoprene-N-vinylpyrrolidone copolymer, and mixtures thereof.

10. A composite pressure-sensitive adhesive comprising:
from about 95 to about 5 parts by weight of an acrylic pressure-sensitive adhesive;
from about 5 to about 95 parts by weight of an at least partially soluble saturated olefin-containing polymer; and
a compatibilizer present in the composite pressure-sensitive adhesive in an amount greater than 0 to about 10 parts by weight of the composite pressure-sensitive adhesive, the compatibilizer having the formula $R^3$—Y, wherein: $R^3$ is a saturated olefin-containing segment and Y is a segment having at least one functional group capable of undergoing an ionic interaction or covalent reaction with the acrylic adhesive component of the composite pressure-sensitive adhesive.

11. A composite pressure-sensitive adhesive comprising:
from about 95 to about 5 parts by weight of an acrylic pressure-sensitive adhesive;
from about 5 to about 95 parts by weight of an at least partially soluble saturated olefin-containing polymer; and
a compatibilizer present in the composite pressure-sensitive adhesive in an amount greater than 0 to about 10 parts by weight of the composite pressure-sensitive adhesive, the compatibilizer being the product of a reaction between a polyolefin having an anhydride, epoxide, or acid functionality, and an amine selected from the group consisting of 3-dimethylaminopropyl amine, N,N-dimethylethylenediamine, 2-(2-aminoethyl)pyridine, 1-(2-aminoethyl)pyrrolidine, 3-aminoquinuclidine, and mixtures thereof.

12. A composite pressure-sensitive adhesive comprising:
from about 95 to about 5 parts by weight of an acrylic pressure-sensitive adhesive;
from about 5 to about 95 parts by weight of a polymer selected from the group consisting of a butadiene-containing polymer, an isoprene-containing polymer, and a saturated olefin-containing polymer, which polymer is optionally a pressure-sensitive adhesive; and
a compatibilizer, which is not a reaction product of the acrylic pressure-sensitive adhesive and the polymer, present in the composite pressure-sensitive adhesive in an amount greater than 0 to about 10 parts by weight of the composite pressure-sensitive adhesive, the compatibilizer having a structure selected from the group consisting of (1) an acrylic adhesive-compatible segment and a polymer-compatible segment wherein at least a portion of the compatibilizer is present substantially throughout either the acrylic adhesive, the polymer, or both, and (2) an acrylic adhesive-reactive segment and a polymer-compatible segment wherein at least a portion of the compatibilizer is present substantially throughout the polymer.

13. A composite pressure-sensitive adhesive comprising:
from about 95 to about 5 parts by weight of an acrylic pressure-sensitive adhesive;
from about 5 to about 95 parts by weight of an at least partially soluble saturated olefin-containing polymer; and
a compatibilizer present in the composite pressure-sensitive adhesive in an amount greater than 0 to about 10 parts by weight of the composite pressure-sensitive adhesive,
wherein the compatibilizer having a structure selected from the group consisting of (1) an acrylic adhesive-compatible segment and a polymer-compatible segment wherein at least a portion of the compatibilizer is present substantially throughout either the acrylic adhesive, the polymer, or both, and (2) an acrylic adhesive-reactive segment and a polymer-compatible segment wherein at least a portion of the compatibilizer is present substantially throughout the polymer;
and wherein the compatibilizer is the product of a reaction between a polyolefin having an anhydride, epoxide, or acid functionality, and an amine selected from the group consisting of 3-dimethylaminopropyl amine, N,N-dimethylethylenediamine, 2-(2-aminoethyl) pyridine, 1-(2-aminoethyl)pyrrolidine, 3-aminoquinuclidine, and mixtures thereof.

14. The composite pressure-sensitive adhesive of claim 1 wherein the compatibilizer is present in the composite pressure-sensitive adhesive in an amount greater than 0 to about 5 parts by weight.

15. The composite pressure-sensitive adhesive of claim 1 wherein the acrylic adhesive and the polymer are arranged in alternating layers.

16. A composite pressure-sensitive adhesive comprising:
from about 95 to about 5 parts by weight of an acrylic pressure-sensitive adhesive;
from about 5 to about 95 parts by weight of an at least partially soluble polymer selected from the group consisting of a butadiene-containing polymer, an isoprene-containing polymer, and a saturated olefin-containing polymer; and
a compatibilizer present in the composite pressure-sensitive adhesive in an amount greater than 0 to about 10 parts by weight of the composite pressure-sensitive adhesive, the compatibilizer having a structure selected from the group consisting of (1) an acrylic adhesive-compatible segment and a polymer-compatible segment wherein at least a portion of the compatibilizer is present substantially throughout either the acrylic adhesive, the polymer, or both, and (2) an acrylic adhesive-reactive segment and a polymer-compatible segment wherein at least a portion of the compatibilizer is present substantially throughout the polymer, wherein the acrylic adhesive and the polymer are arranged in alternating layers comprising from 5 to 100 layers.

17. The composite pressure-sensitive adhesive of claim 1 further comprising crosslinks.

18. The composite pressure-sensitive adhesive of claim 1 having at least one pressure-sensitive adhesive property from the group consisting of a room temperature shear strength greater than about 10,000 minutes, a peel adhesion greater than that of a substantially similar composite pressure-sensitive adhesive having no compatibilizer, and a 500-gram weight 70° C. shear strength greater than that of a substantially similar composite pressure-sensitive adhesive having no compatibilizer.

19. The composite pressure-sensitive adhesive of claim 1 wherein the acrylic adhesive and the polymer are in a mixture in which the adhesive is in a phase that is continuous and the polymer is in a phase that is discontinuous or co-continuous.

20. A pressure-sensitive adhesive article comprising a backing having opposing surfaces, at least one the surfaces bearing thereon the composite pressure-sensitive adhesive of claim 1.

* * * * *

UNITED STATES PATENT AND TRADEMARK OFFICE
CERTIFICATE OF CORRECTION

PATENT NO.    : 6,630,239 B2
DATED         : October 7, 2003
INVENTOR(S)   : Cernohous, Jeffrey J.

It is certified that error appears in the above-identified patent and that said Letters Patent is hereby corrected as shown below:

Title page,
Item [56], References Cited, FOREIGN PATENT DOCUMENTS, delete "Wo 97/23577" and insert in place thereof -- WO 97/23577 --.

Column 7,
Line 53, delete "isophtaloyl" and insert in place thereof -- isophthaloyl --.

Column 17,
Line 14, delete "sec-butyllithium" and insert in place thereof -- sec-butyl lithium --.

Column 18,
Line 34, delete "isophtaloyl" and insert in place thereof -- isophthaloyl --.
Line 41, delete "of" before "addition".

Column 19,
Line 62, delete "3.7 in/mm." and insert in place thereof -- 3.7 m/min. --.

Column 21,
Lines 1 and 54, delete "Comparative Example" and insert in place thereof -- Comparative Examples --.
Line 37, delete "peel" following "for".

Column 23,
Line 63, delete "of" and insert in place thereof -- or --.
Line 67, delete "at" following "glass".

Column 24,
Line 47, delete "Example" and insert in place thereof -- Examples --.
Line 50, delete "an" and insert in place thereof -- a --.

Column 26,
Line 27, delete "Example" and insert in place thereof -- Examples --.

UNITED STATES PATENT AND TRADEMARK OFFICE
CERTIFICATE OF CORRECTION

PATENT NO.    : 6,630,239 B2
DATED         : October 7, 2003
INVENTOR(S)   : Cernohous, Jeffrey J.

It is certified that error appears in the above-identified patent and that said Letters Patent is hereby corrected as shown below:

Column 27,
Line 20, delete "irridated" and insert in place thereof -- irradiated --.
Line 20, insert -- as -- following "much".
Line 42, delete "isophtaloyl" and insert in place thereof -- isophthaloyl --.

Column 28,
Line 22, delete "more" following "and".

Column 29,
Line 16, delete "of:" and insert in place thereof -- of --.

Column 30,
Line 27, delete "wherein:" and insert in place thereof -- wherein --.
Line 28, delete "of:" and insert in place thereof -- of --.

Column 31,
Line 43, delete "wherein:" and insert in place thereof -- wherein --.

Column 34,
Line 11, delete "one the" and insert in place thereof -- one of the --.

Signed and Sealed this

Thirteenth Day of September, 2005

JON W. DUDAS
*Director of the United States Patent and Trademark Office*